US012791131B2

(12) United States Patent
Treur et al.

(10) Patent No.: US 12,791,131 B2
(45) Date of Patent: Nov. 10, 2026

(54) FLUID DELIVERY SYSTEM

(71) Applicant: Ichor Systems, Inc., Fremont, CA (US)

(72) Inventors: Randolph Treur, San Luis Obispo, CA (US); Philip Ryan Barros, Pleasanton, CA (US); Stephen Carson, Woodstock, NY (US); Michael Vogtmann, Templeton, CA (US); Haruyuki Kubota, San Francisco, CA (US)

(73) Assignee: ICHOR SYSTEMS, INC.

( * ) Notice: Subject to any disclaimer, the term of this patent is extended or adjusted under 35 U.S.C. 154(b) by 0 days.

(21) Appl. No.: 18/752,900

(22) Filed: Jun. 25, 2024

(65) Prior Publication Data

US 2025/0003537 A1 Jan. 2, 2025

Related U.S. Application Data

(60) Provisional application No. 63/524,981, filed on Jul. 5, 2023, provisional application No. 63/524,461, filed on Jun. 30, 2023.

(51) Int. Cl.

| | |
|---|---|
| ***F16L 23/22*** | (2006.01) |
| ***F16J 15/06*** | (2006.01) |
| ***F16J 15/08*** | (2006.01) |
| ***F16J 15/10*** | (2006.01) |

(52) U.S. Cl.

CPC ............. *F16L 23/22* (2013.01); *F16J 15/061* (2013.01); *F16J 15/062* (2013.01); *F16J 15/0881* (2013.01); *F16J 15/104* (2013.01)

(58) Field of Classification Search

CPC ...... F16J 15/061; F16J 15/062; F16J 15/0881; F16J 15/0887; F16J 15/104; F16L 23/18; F16L 23/20; F16L 23/22

See application file for complete search history.

(56) References Cited

U.S. PATENT DOCUMENTS

| | | | | |
|---|---|---|---|---|
| 5,466,018 | A * | 11/1995 | Stobbart | F16L 23/167 277/614 |
| 10,400,923 | B2 * | 9/2019 | Shirani | F16J 15/062 |
| 10,704,712 | B1 * | 7/2020 | Boulanger | F16L 23/22 |
| 11,158,521 | B2 * | 10/2021 | Melcer | F16J 15/104 |

(Continued)

FOREIGN PATENT DOCUMENTS

CN 102510944 A 6/2012

OTHER PUBLICATIONS

International Search Report and Written Opinion of PCT/US2024/035336, Issued Sep. 6, 2024.

*Primary Examiner* — Nicholas L Foster

(74) *Attorney, Agent, or Firm* — The Belles Group, P.C.

(57) ABSTRACT

Fluid delivery systems are important component assemblies used for semiconductor fabrication. These fluid delivery systems rely on assemblies of components, requiring seals which must be installed and replaced during assembly and maintenance of the fluid delivery systems. Seals may be arranged as seal rings which engage substrate blocks and active components. The seal rings may incorporate an interior sleeve and an outer ring, the interior sleeve having a sleeve fluid passageway. In some implementations, the sleeve fluid passageway may have a constant or varying diameter and the outer ring may incorporate features to improve seal retention within seal cavities in the substrate blocks and active components.

14 Claims, 14 Drawing Sheets

(56) References Cited

U.S. PATENT DOCUMENTS

| | | | | |
|---|---|---|---|---|
| 11,158,522 | B2 * | 10/2021 | Melcer | H01L 21/67017 |
| 11,990,354 | B2 * | 5/2024 | Melcer | F16J 15/104 |
| 12,062,553 | B2 * | 8/2024 | Melcer | F16K 27/003 |
| 2001/0045709 | A1 * | 11/2001 | Stobbart | F16L 23/18 277/602 |
| 2007/0262581 | A1 | 11/2007 | Ishihara | |
| 2009/0072536 | A1 | 3/2009 | Katsura | |
| 2010/0320699 | A1 | 12/2010 | Takeda et al. | |
| 2015/0176744 | A1 * | 6/2015 | Glassman | F16J 15/061 277/609 |
| 2018/0231158 | A1 * | 8/2018 | Shirani | E21B 17/085 |
| 2019/0301608 | A1 * | 10/2019 | Takeda | F16J 15/10 |
| 2019/0368609 | A1 * | 12/2019 | Adachi | F16J 15/062 |
| 2020/0393068 | A1 * | 12/2020 | Nakano | F16J 15/104 |
| 2020/0408305 | A1 | 12/2020 | Adachi et al. | |
| 2021/0033225 | A1 * | 2/2021 | Adachi | F16J 15/104 |
| 2021/0054932 | A1 * | 2/2021 | Koike | F16J 15/062 |
| 2021/0159093 | A1 * | 5/2021 | Melcer | H01L 21/67017 |
| 2021/0193487 | A1 * | 6/2021 | Melcer | F16K 27/003 |
| 2021/0317932 | A1 * | 10/2021 | Ohmae | F16L 17/06 |
| 2022/0025996 | A1 * | 1/2022 | Ohmae | F16L 19/0237 |
| 2022/0028705 | A1 * | 1/2022 | Melcer | F16K 27/003 |
| 2022/0384217 | A1 * | 12/2022 | Melcer | F16K 27/003 |
| 2023/0039578 | A1 * | 2/2023 | Kurosaki | F16L 19/05 |
| 2023/0162993 | A1 | 5/2023 | Treur et al. | |
| 2023/0341052 | A1 * | 10/2023 | Ohmae | F16J 15/106 |
| 2023/0349492 | A1 * | 11/2023 | Ohmae | F16J 15/062 |
| 2024/0274444 | A1 * | 8/2024 | Melcer | H01L 21/67017 |
| 2024/0344628 | A1 * | 10/2024 | Carson | F16K 15/023 |

* cited by examiner

FLUID DELIVERY SYSTEM

CROSS-REFERENCE TO RELATED APPLICATIONS

This application claims the benefit of U.S. Provisional Application No. 63/524,461, filed Jun. 30, 2023, and U.S. Provisional Application No. 63/524,981, filed Jul. 5, 2023, which are incorporated herein by reference in their entireties.

BACKGROUND OF THE INVENTION

Fluid delivery is a key component of semiconductor chip fabrication tools. Fluid delivery systems are important for delivering known flow rates of process fluids for semiconductor fabrication and other industrial processes. Such devices are used to measure and accurately control the flow of a wide range of fluids for a variety of applications. This control relies on assemblies of active and passive components which are sealed by seals to provide fluid-tight connections.

As the technology of chip fabrication has improved, so has the demand on the fluid delivery systems. Higher performance fluid delivery systems are packaged with higher densities, require higher performing seals, and these seals must be serviced more efficiently. Time to assemble and service fluid delivery systems must be reduced. Ease of service and assembly of fluid delivery systems is of utmost importance. Furthermore, seal reliability is essential to maximizing system up-time. In order to deliver superior process performance, improved fluid delivery systems are desired.

SUMMARY OF THE INVENTION

The present technology is directed to a fluid delivery system incorporating one or more apparatuses for controlling flow to deliver a gas or a liquid to a process chamber, these apparatuses having ports which are sealed using seal rings to ensure leak-free transfer of fluid from one device to another. The fluid delivery system may be used in a wide range of processes such as semiconductor chip fabrication, solar panel fabrication, etc.

In one implementation, the invention is a fluid delivery system having a substrate block, an active component, and a seal ring. The substrate block has an upper surface, a substrate port in the upper surface, a substrate fluid passageway extending from the substrate port, a substrate ring defining the substrate port, a substrate seal channel formed in the upper surface and surrounding the substrate ring, an outer surface of the substrate ring forming an inner surface of the substrate seal channel, and a conical portion extending from the substrate ring to the substrate fluid passageway. The active component has a lower surface, a component port in the lower surface, a component fluid passageway extending from the component port, a component ring defining the component port, a component seal channel formed in the lower surface and surrounding the component ring, an outer surface of the component ring forming an inner surface of the component seal channel, and a conical portion extending from the component ring to the component fluid passageway. The seal ring has an interior sleeve having an upper conical portion, a lower conical portion, and a central portion, the interior sleeve defining a sleeve fluid passageway, the sleeve fluid passageway having a diameter that is substantially constant along a longitudinal axis. The seal ring further has an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve. The active component is mounted to the substrate block so that: (1) the substrate port and the component port are aligned; and (2) the seal ring nests in each of the substrate seal channel and the component seal channel and the seal ring fluidly seals the substrate fluid passageway and the component fluid passageway.

In another aspect, the invention is a seal ring having an interior sleeve and an outer ring. The interior sleeve has an upper conical portion, a lower conical portion, and a central portion, the interior sleeve defining a sleeve fluid passageway, the sleeve fluid passageway having a diameter that is substantially constant along a longitudinal axis. The outer ring is connected to the central portion of the interior sleeve and surrounds the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve.

In one implementation, the invention is a fluid delivery system having a substrate block, an active component, and a seal ring. The substrate block has an upper surface, a substrate port in the upper surface, a substrate fluid passageway extending from the substrate port, a substrate ring defining the substrate port, a substrate seal channel formed in the upper surface and surrounding the substrate ring, an outer surface of the substrate ring forming an inner surface of the substrate seal channel, and a conical portion extending from the substrate ring to the substrate fluid passageway. The active component has a lower surface, a component port in the lower surface, a component fluid passageway extending from the component port, a component ring defining the component port, a component seal channel formed in the lower surface and surrounding the component ring, an outer surface of the component ring forming an inner surface of the component seal channel, and a conical portion extending from the component ring to the component fluid passageway. The seal ring has an interior sleeve having an upper conical portion, a lower conical portion, and a central portion, the interior sleeve defining a sleeve fluid passageway. The seal ring further has an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve. The active component is mounted to the substrate block so that: (1) the substrate port and the component port are aligned; and (2) the seal ring nests in each of the substrate seal channel and the component seal channel and the seal ring fluidly seals the substrate fluid passageway and the component fluid passageway. The outer ring has castellations.

Further areas of applicability of the present technology will become apparent from the detailed description provided hereinafter. It should be understood that the detailed description and specific examples, while indicating the preferred implementation, are intended for purposes of illustration only and are not intended to limit the scope of the technology.

BRIEF DESCRIPTION OF THE DRAWINGS

The invention of the present disclosure will become more fully understood from the detailed description and the accompanying drawings, wherein.

Figure 1:
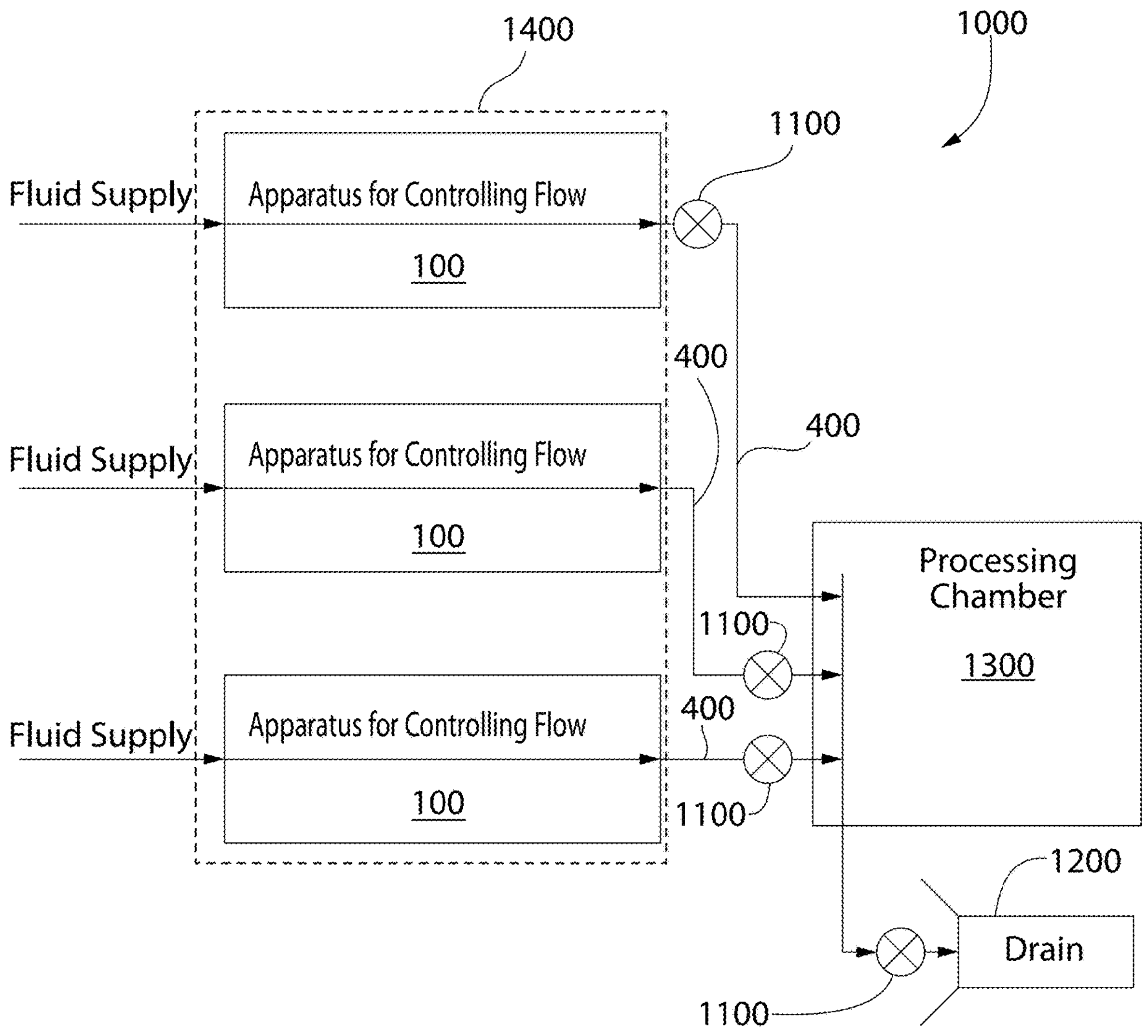
FIG. 1 is a schematic of a system for manufacturing semiconductor devices utilizing one or more apparatuses for controlling flow.

All drawings are schematic and not necessarily to scale. Features shown numbered in certain figures which may appear un-numbered in other figures are the same features unless noted otherwise herein.

DETAILED DESCRIPTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

The present invention is directed to a seal rings for use in a fluid delivery system comprising at least one apparatus for controlling fluid flow. In some embodiments, the fluid delivery system may include a mass flow controller to deliver a known mass flow of fluid to a semiconductor process or similar process. Semiconductor fabrication is one industry which demands high performance in control of fluid flows. As semiconductor fabrication techniques have advanced, customers have recognized the need for flow control devices with increased complexity and capability. Modern semiconductor processes require that the cost of the fluid delivery systems is reduced and parts interchangeability is maximized. The present invention provides for a seal ring which can be utilized in a variety of applications within the fluid delivery system.

FIG. 1 shows a schematic of an exemplary processing system 1000. The processing system 1000 may utilize a plurality of apparatus for controlling flow 100 fluidly coupled to a processing chamber 1300. The plurality of apparatus for controlling flow 100 are used to supply one or more different process fluids to the processing chamber 1300. Fluids are provided by a plurality of fluid supplies, or fluid sources. Collectively, the plurality of apparatus for controlling flow 100 belong to a fluid delivery system 1400. Optionally, more than one fluid delivery system 1400 may be utilized in the processing system 100. The plurality of apparatus for controlling flow 100 are connected to the processing chamber 1300 by an outlet manifold 400. Articles such as semiconductors and integrated circuits may be processed within the processing chamber 1300.

Valves 1100 isolate each of the apparatus for controlling flow 100 from the processing chamber 1300, enabling each of the apparatus for controlling flow 100 to be selectively connected or isolated from the processing chamber 1300, facilitating a wide variety of different processing steps. The processing chamber 1300 may contain an applicator to apply process fluids delivered by the plurality of apparatus for controlling flow 100, enabling selective or diffuse distribution of the fluids supplied by the plurality of apparatus for controlling flow 100. Optionally, the processing chamber 1300 may be a vacuum chamber or may be a tank or bath for immersing articles in the fluids supplied by the plurality of apparatus for controlling flow 100. A fluid supply line is formed by the flow path from each of the respective fluid supplies to the processing chamber 1300.

In addition, the processing system 1000 may further comprise a drain 1200 which is isolated from the processing chamber 1300 by a valve 1100 to enable evacuation of process fluids or facilitate purging one or more of the apparatus for controlling flow 100 to enable switching between process fluids in the same apparatus for controlling flow 100. Optionally, the drain 1200 may be a source of vacuum or may be a liquid drain configured to remove liquids from the processing chamber 1300. Optionally, the apparatus for controlling flow 100 may be mass flow controllers, flow splitters, or any other device which controls the flow of a process fluid in a processing system. Furthermore, the valves 1100 may be integrated into the apparatus for controlling flow 100 if so desired.

Processes that may be performed in the processing system 1000 may include wet cleaning, photolithography, ion implantation, dry etching, atomic layer etching, wet etching, plasma ashing, rapid thermal annealing, furnace annealing, thermal oxidation, chemical vapor deposition, atomic layer deposition, physical vapor deposition, molecular beam epitaxy, laser lift-off, electrochemical deposition, chemical-mechanical polishing, wafer testing, electroplating, or any other process utilizing fluids.

Figure 2:
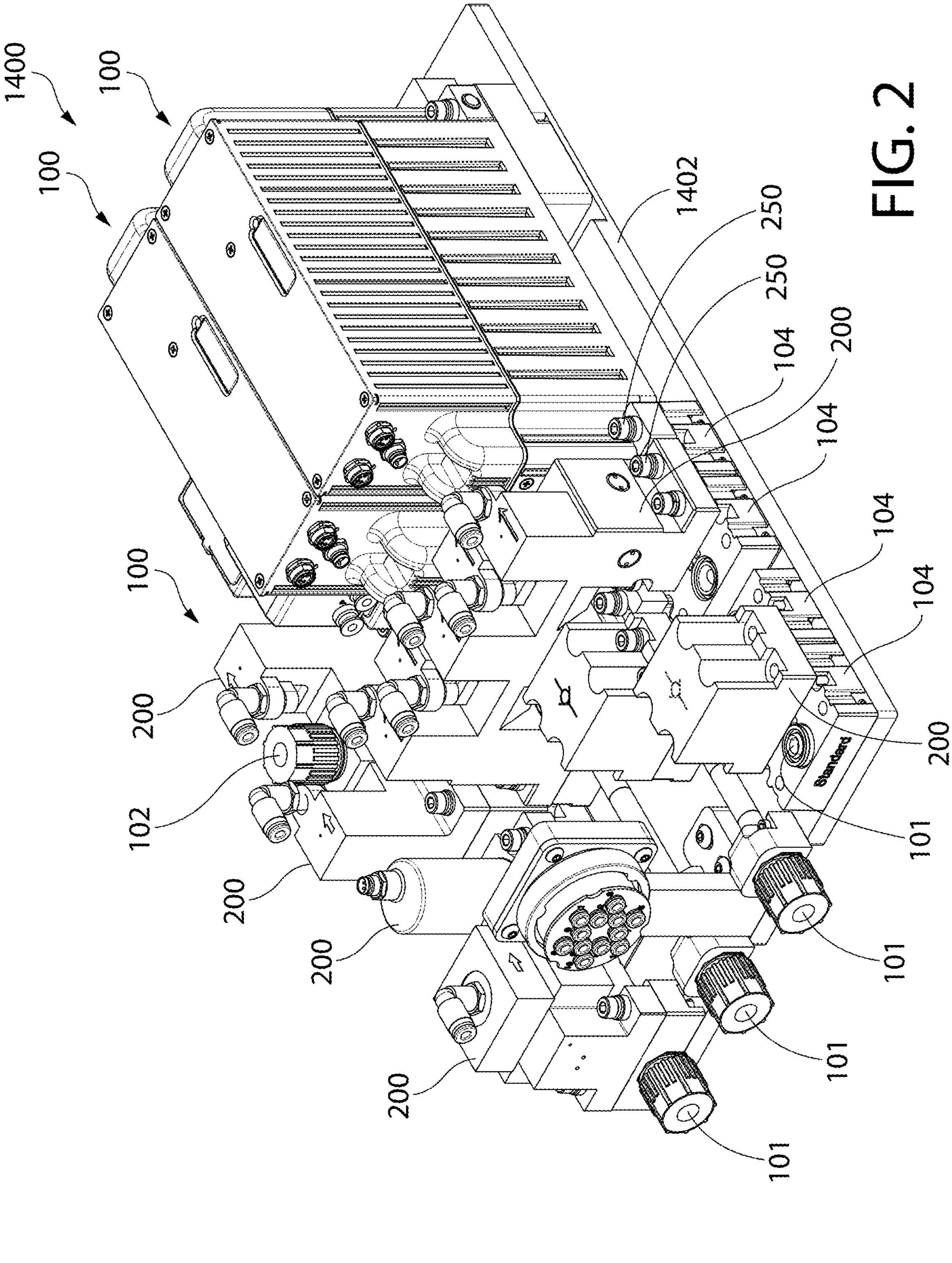
FIG. 2 is a perspective view of a fluid delivery system comprising a plurality apparatuses for controlling flow as may be utilized in the process of FIG. 1.
Figure 3:
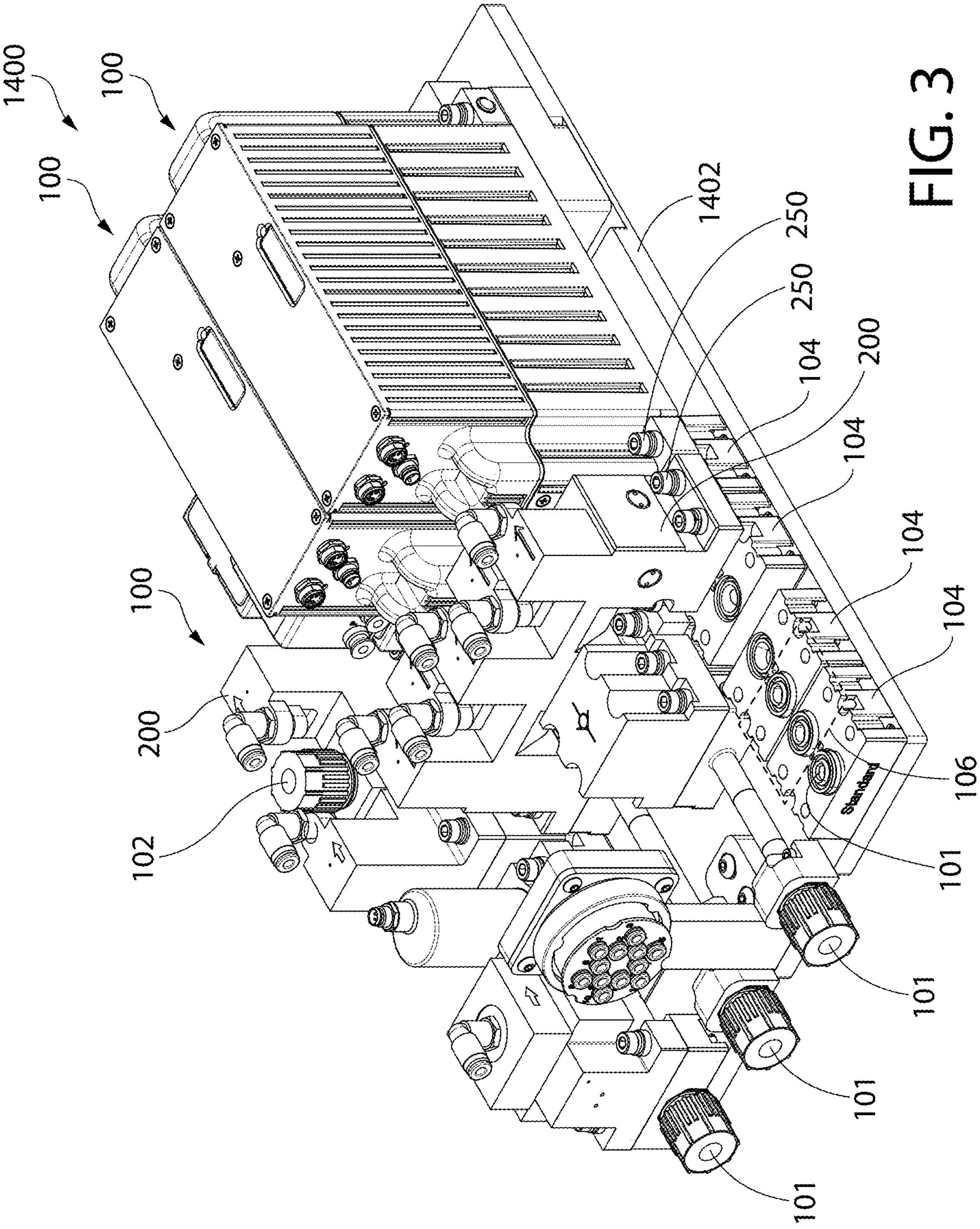
FIG. 3 is a perspective view of the fluid delivery system of FIG. 2 showing one fluid flow component removed.

FIGS. 2 and 3 show a schematic of an exemplary fluid delivery system 1400. In this embodiment, the fluid delivery system 1400 has a plurality of apparatus for controlling flow 100 having a plurality of inlets 101 and a plurality of outlets 102. In some embodiments, the plurality of inlets 101 do not correspond to the plurality of outlets 102 in a one to one manner. Instead, a plurality of inlets 101 may be joined into a single outlet 102 and a single inlet 101 may be split into a plurality of outlets 102. This may be done to achieve mixing or combination of different fluids prior to providing them to the process chamber 1300. Nonetheless, at least one flow passage extends from one of the inlets 101 to one of the outlets 102, the flow passage being formed by the various components of the fluid delivery system 1400.

As can be seen, each of the apparatus for controlling flow 100 is arranged generally in a row, with the plurality of apparatus 100 in parallel rows. This need not be the case, and any packaging configuration may be used. The fluid delivery system 1400 has a substrate panel 1402. The substrate panel 1402 serves as support structure for the fluid delivery system 1400, but it may be simply used to facilitate assembly. Other structural support configurations are contemplated. A plurality of substrate blocks 104 rest on the substrate panel 1402 and comprise fluid ports therein to conduct flow to one or more fluid flow components 200 having corresponding fluid ports as discussed in greater detail below. The fluid flow components 200 may be considered active components while the substrate blocks 104 may be considered passive components.

The fluid flow components 200 may be one or more of a valve, a flow controller, a pressure transducer, a flow measurement sensor, a pressure regulator, a flow restrictor, an actuator, an inlet 101 or outlet 102, or any other known flow control component. In other embodiments, the substrate blocks 104 may be utilized on the top and the fluid flow components 200 may rest against the substrate panel 1402. This may be done to enhance packaging efficiency, enable greater flexibility in design of an apparatus for controlling flow 100, or for other reasons. Substrate blocks 104 need not necessarily be in contact with the substrate panel 1402, but are referred to as substrate blocks for the sake of explanation with the understanding that the names of the respective components do not necessarily indicate their position or orientation.

A plurality of anchors are used to couple the fluid flow components 200 to the substrate blocks 104. The anchors may be threaded inserts or threads in the substrate blocks 104, threaded inserts or threads in the substrate panel 1402, nuts, or other anchoring features which permit secure fastening of the fluid flow components 200. Component fasteners 250 are used to secure fluid flow components 200 to substrate blocks 104. Optionally, the component fasteners 250 extend through the substrate blocks 104 to attach the fluid flow components 200 and the substrate blocks 104 to the substrate panel 1402. In alternate configurations, additional fasteners are used to secure the substrate blocks 104 to the substrate panel 1402. The component fasteners 250 may be used for alignment as well as for fastening and may be replaced by any suitable type of fastener capable of fastening the fluid flow components 200 to the substrate blocks 104. The component fasteners 250 may be fasteners such as bolts, screws, pins, or other known fastening device. However, in other embodiments, the component fasteners 250 may be separate from the alignment features. For instance, dowel pins or other pins may be used to align the fluid flow component 200 to the substrate blocks 104. Then, a separate component fastener may be used for fastening the fluid flow component 200 to the substrate blocks 104.

As can be seen by comparing FIG. 2 with FIG. 3, a fluid flow component 200 is removed from the fluid delivery system 1400 of FIG. 3. The removal of the fluid flow component 200 exposes portions of two substrate blocks 104. A component mounting location 106 is formed by the portions of the two substrate blocks 104. The component mounting location 106 may vary in size depending on the dimensions of the component 200 mounted to the component mounting location 106. Thus, different component mounting locations 106 may comprise different portions of the same substrate block 104. Each and every component 200 has a component mounting location 106 in the fluid delivery system 1400. More than two substrate blocks 104 may be utilized to form a component mounting location 106. Alternatively, only one substrate block 104 may be utilized to form a component mounting location 106. This will depend on the type of component 200 which is mounted to the component mounting location 106.

Figure 4A:
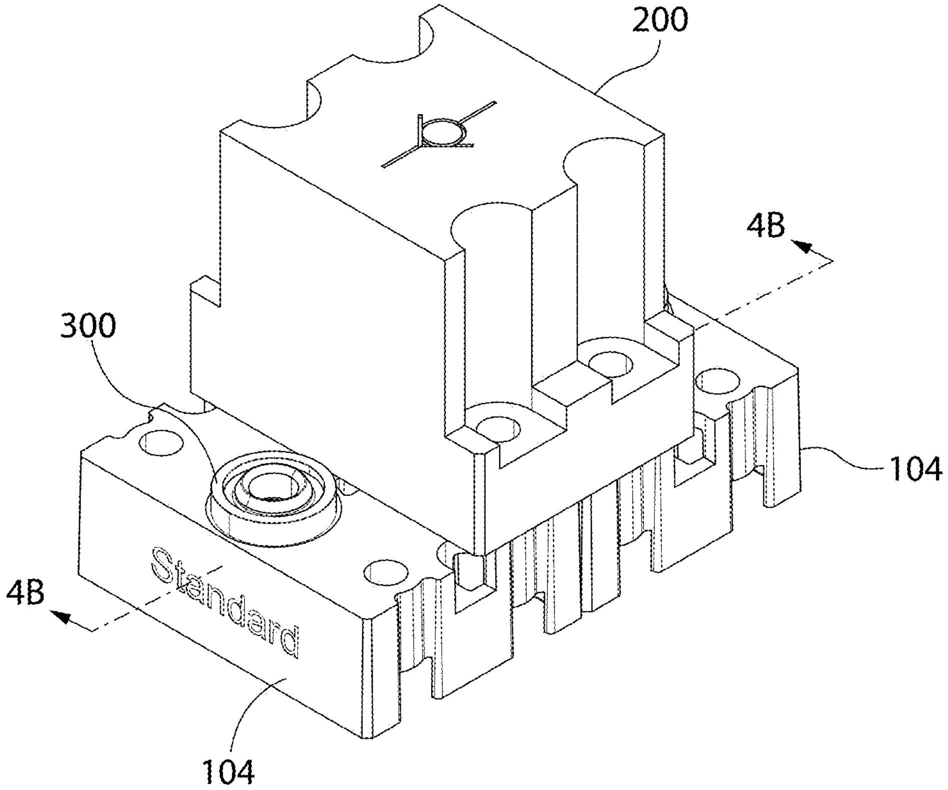
FIG. 4A is a perspective view of an active component mounted to a pair of substrate blocks as may be utilized in the fluid delivery system of FIG. 2.
Figure 4B:
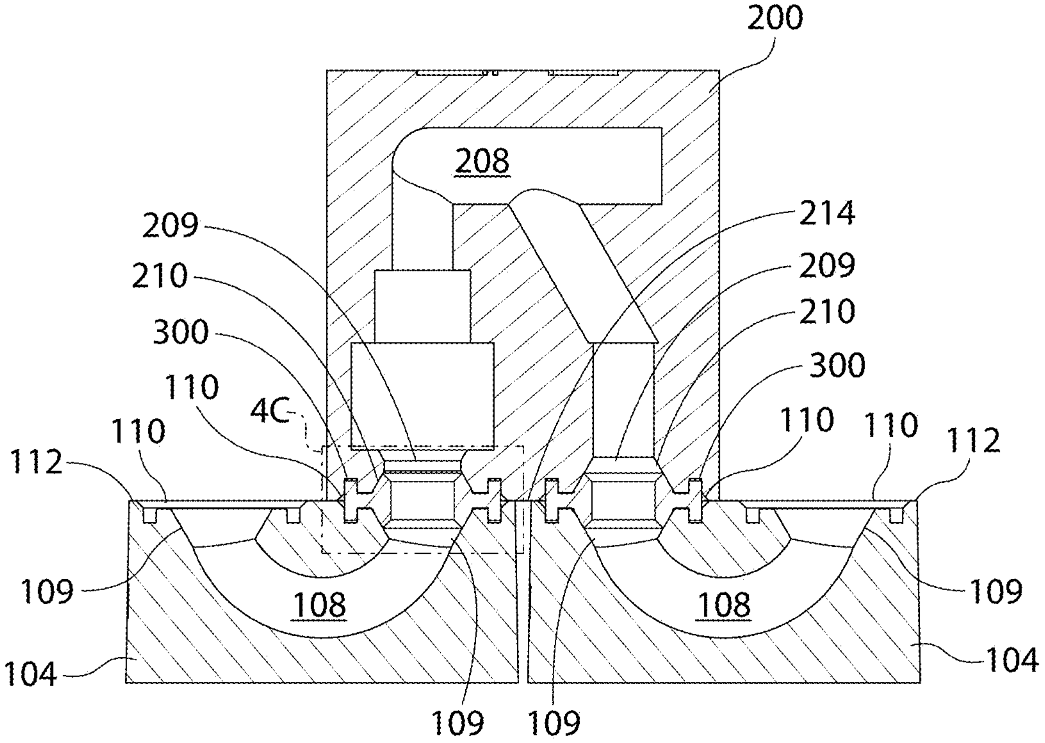
FIG. 4B is a cross-sectional view of the component and one of the substrate blocks of FIG. 4A, taken along line 4B-4B.

Turning to FIGS. 4A-D, a portion of the fluid delivery system 1400 is shown. Specifically, a fluid flow component 200 is shown mounted to a pair of substrate blocks 104 at a component location 106. As best shown in FIG. 4B, seal rings 300 are positioned between the fluid flow component 200 and the substrate blocks 104. The seal rings 300 form a fluid-tight connection between the fluid flow component 200 and the substrate blocks 104. The substrate blocks 104 each comprise a fluid passageway 108 extending from a first substrate port 109 to a second substrate port 109. Each of the first substrate ports 109 are formed in an upper surface 112 of the substrate block 104.

Similarly, the fluid flow component 200 comprises a fluid passageway 208 extending from a first component port 209 formed in a lower surface 214 to a second component port 209 formed in the lower surface 214. The substrate ports 109 of the substrate blocks 104 are surrounded by seal cavities 110 which receive a seal ring 300. The component ports 209 of the fluid flow component 200 are surrounded by seal cavities 210 which receive a seal ring 300.

The seal ring 300 is formed in a generally annular configuration, with an interior sleeve 302 and an outer ring 304. The interior sleeve 302 of the seal ring 300 has a sleeve fluid passageway 308 formed through the center of the seal ring 300. The sleeve fluid passageway 308 extends along a longitudinal axis A-A. The interior sleeve 302 and the outer ring 304 are symmetrical about the longitudinal axis A-A. The sleeve fluid passageway 308 permits fluid flow through the seal ring 300 and other features of the seal ring 300 provide a hermetic seal between coupled fluid flow components 200 and substrate blocks 104. In some embodiments, the interior sleeve 302 and the outer ring 304 may not be symmetrical about the longitudinal axis A-A.

Figure 4C:
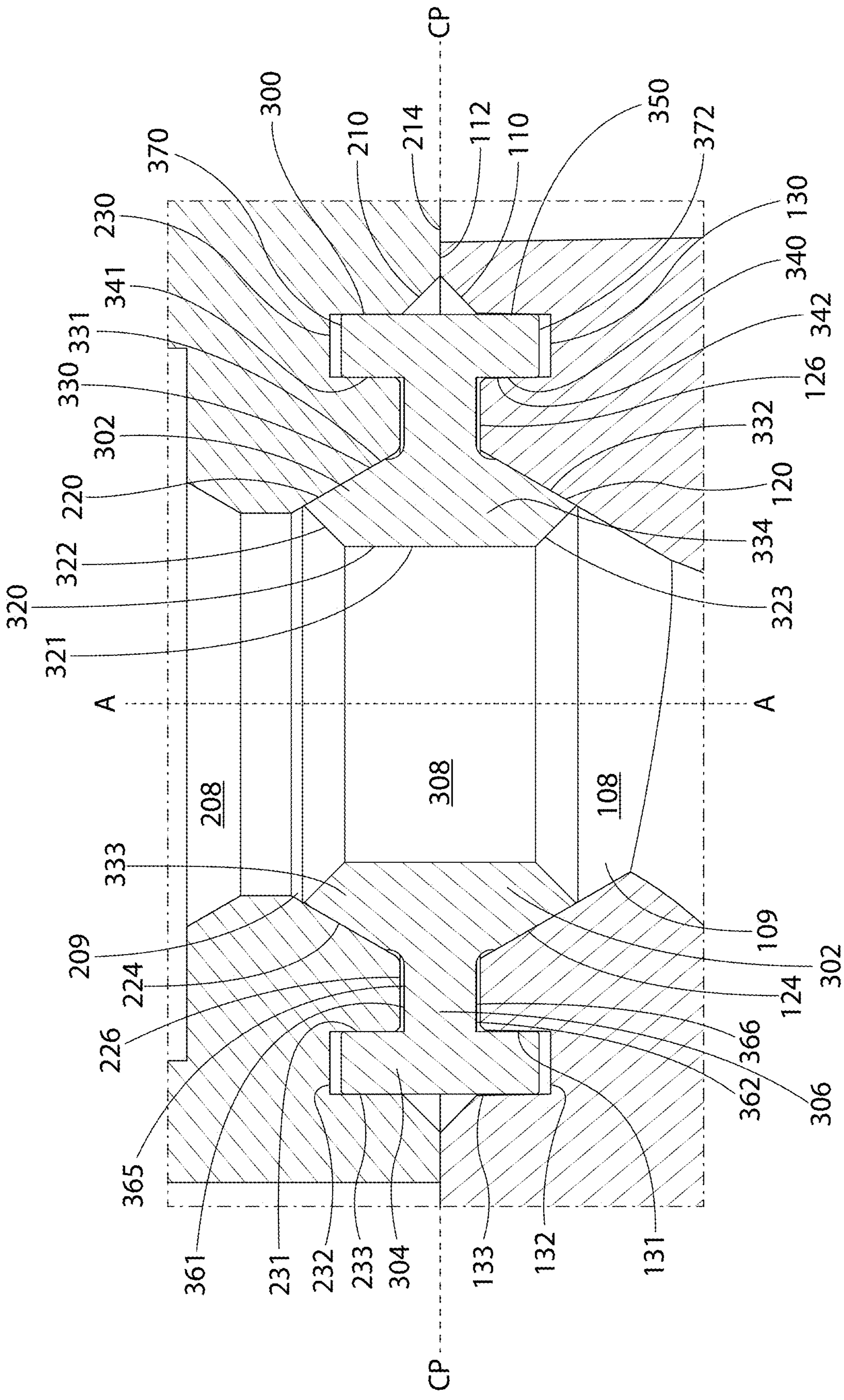
FIG. 4C is a detail view of FIG. 4A showing an interface between the component and one of the substrate blocks.
Figure 4D:
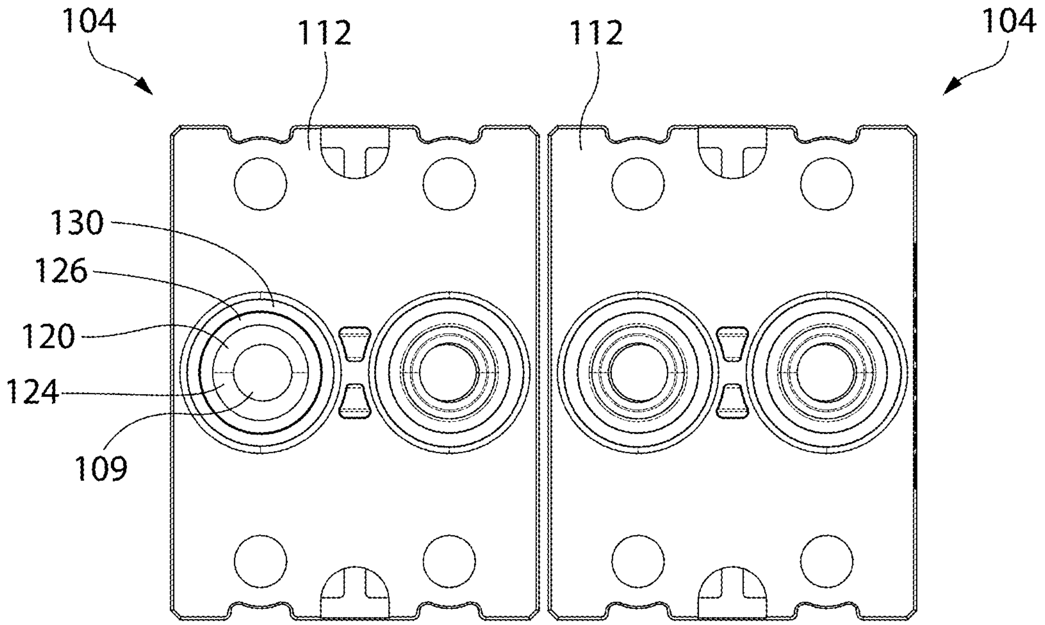
FIG. 4D is a top view of the substrate blocks of FIG. 4A.
Figure 4E:
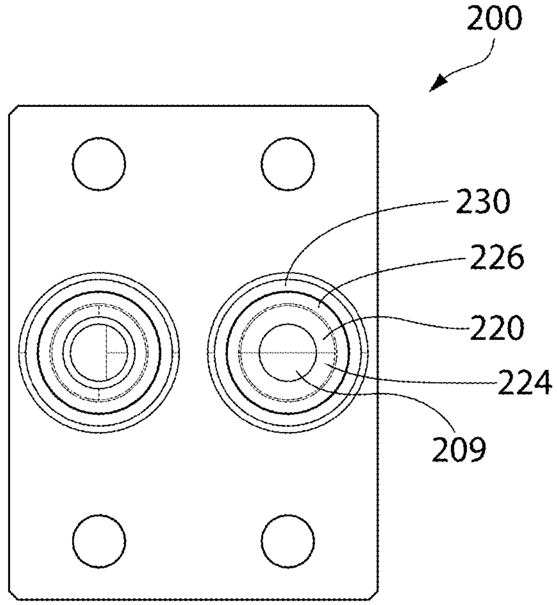
FIG. 4E is a bottom view of the component of FIG. 4A.

The interior sleeve 302 comprises a passageway surface 320 which forms the wall of the sleeve fluid passageway 308. The passageway surface 320 comprises an intermediate surface 321, an upper inclined surface 322, and a lower inclined surface 323. The upper inclined surface 322 joins the component port 209 to the sleeve fluid passageway 308. The lower inclined surface 323 joins the substrate port 109 to the sleeve fluid passageway 308. The intermediate surface 321 couples the upper and lower inclined surfaces 322, 323. The upper and lower inclined surfaces 322, 323 may have a linear profile (i.e. a straight line with constant slope) as shown in FIGS. 4B and 4C or may have a curved profile. The curved profile may be convex, concave, or any other desired shape. Similarly, the intermediate surface 321 may be linear and parallel to the longitudinal axis, linear and sloped with respect to the longitudinal axis, or curved in a convex or concave profile.

The interior sleeve 302 also comprises a first mating surface 330 which engages corresponding features in the seal cavities 110, 210 of the substrate block 104 and the fluid flow component 200 as will be discussed in greater detail below. The first mating surface 330 comprises an upper mating surface 331 and a lower mating surface 332. The upper mating surface 331 engages features of the seal cavity 210 of the fluid flow component 200 while the lower mating surface 332 engages features of the seal cavity 110 of the substrate block 104. The upper and lower mating surfaces 331, 332 may have a linear geometry, a convex geometry, or a concave geometry. In the present embodiment, the upper and lower mating surfaces 331, 332 have a linear geometry.

The seal ring 300 is symmetric about a central plane CP, the central plane CP perpendicular to the longitudinal axis A-A. The interior sleeve 302 of the seal ring 300 has an upper conical portion 333 and a lower conical portion 334. The upper mating surface 331 is formed on the upper conical portion 333 and the lower mating surface 332 is formed on the lower conical portion.

The outer ring 304 has an inner surface 340 and an outer surface 350. The inner surface 340 is proximate the interior sleeve 302 and faces the first mating surface 330. The outer surface 350 is opposite the inner surface 340. The inner surface 340 may be divided into an upper inner surface 341 and a lower inner surface 342.

The interior sleeve 302 is joined to the outer ring 304 by a web 306, the web 306 separating the upper and lower inner surfaces 341, 342 and the upper and lower mating surfaces 331, 332. The web 306 has an upper web surface 361 and a lower web surface 362. The upper web surface 361, along with the upper inner surface 341 of the inner surface 340 of the outer ring 304 and the upper mating surface 331 of the first mating surface 330, form an annular upper sleeve groove 365. Similarly, the lower web surface 362, along with the lower inner surface 342 of the inner surface 340 of the outer ring 304 and the lower mating surface 332 of the first mating surface 330, form an annular lower sleeve groove 366. The outer ring 304 further comprises an upper terminal surface 370 and a lower terminal surface 372.

The seal cavities 110 of the substrate block 104 surround the substrate ports 109 as discussed above. The seal cavities 110 comprise a conical portion 124, a substrate ring 126, and a substrate seal channel 130. The conical portion 124 comprises a second mating surface 120, the conical portion 124 extending from the substrate ring 126 to the fluid passageway 108. The second mating surface 120 forms a portion of the substrate port 109 and receives the lower mating surface 332 of the first mating surface 330 of the seal ring 300. The second mating surface 120 is linear and angled with respect to the longitudinal axis A-A. However, in other embodiments the second mating surface 120 may be convex or concave or any other geometry. The second mating surface 120 may be formed as a separate surface from the substrate port 109 in alternate embodiments.

The substrate ring 126 defines the substrate port 109. The substrate port 109 terminates at the substrate ring 126 and is surrounded by the substrate ring 126. The substrate ring 126 is recessed with respect to the upper surface 112 of the substrate block 104. Surrounding the substrate ring 126 is the substrate seal channel 130. The substrate seal channel 130 is recessed with respect to the substrate ring 126 and the upper surface 112 of the substrate block 104. Thus, the substrate ring 126 protrudes above the substrate seal channel 130. The substrate ring 126 may have any desired geometry. The substrate seal channel 130 has a channel inner surface 131, a channel floor 132, and a channel outer surface 133. The channel inner surface 131 is adjacent to the substrate ring 126 and forms an outer surface of the substrate ring 126. The channel outer surface 133 is opposite the channel inner surface 133 and is radially outward from the channel inner surface 131. The channel floor 132 joins the channel inner surface 131 and the channel outer surface 133.

The seal cavities 210 of the fluid flow component 200 surround the component ports 209 as discussed above. The seal cavities 210 comprise a conical portion 224, a component ring 226, and a component seal channel 230. The conical portion 224 comprises a second mating surface 220, the conical portion 224 extending from the substrate ring 226 to the fluid passageway 208. The second mating surface 220 forms a portion of the component port 209 and receives the upper mating surface 331 of the first mating surface 330 of the seal ring 300. The second mating surface 220 is linear and angled with respect to the longitudinal axis A-A. However, in other embodiments the second mating surface 220 may be convex or concave or any other geometry. The second mating surface 220 may be formed as a separate surface from the component port 209 in alternate embodiments.

The component ring 226 defines the component port 209. The component port 209 terminates at the component ring 226 and is surrounded by the component ring 226. The component ring 226 is recessed with respect to the lower surface 214 of the fluid flow component 200. Surrounding the component ring 226 is the component seal channel 230. The component seal channel 230 is recessed with respect to the component ring 226 and the lower surface 214 of the fluid flow component 200. Thus, the component ring 226 protrudes below the component seal channel 230. The component ring 226 may have any desired geometry. The component seal channel 230 has a channel inner surface 231, a channel floor 232, and a channel outer surface 233. The channel inner surface 231 is adjacent to the component ring 226 and forms an outer surface of the component ring 226. The channel outer surface 233 is opposite the channel inner surface 231 and is radially outward from the channel inner surface 231. The channel floor 232 joins the channel inner surface 231 and the channel outer surface 233.

When in an assembled state as illustrated in FIG. 4C, the channel inner surfaces 131, 231 engage the inner surface 340 of the seal ring 300 while the channel outer surfaces 133, 233 engage the outer surface 350 of the seal ring 300. In particular, the channel inner surface 131 engages the lower inner surface 342 of the seal ring 300. The channel inner surface 231 engages the upper inner surface 341 of the seal ring 300. Thus, the outer ring 304 is radially compressed by the substrate seal channel 130 and the component seal channel 230. The upper and lower terminal surfaces 370, 372 are spaced from the channel floors 132, 232. Similarly, the upper web surface 361 is spaced from the component ring 226 and the lower web surface 362 is spaced from the substrate 126. This beneficially ensures that the first and second mating surfaces 330, 120, 220 are in contact without being over-constrained. As a result, the interface between the first and second mating surfaces 330, 120, 220 form a first seal. The interface between the channel inner surfaces 131, 231 and the inner surface 340 of the seal ring 300 form a second seal. The interface between the channel outer surfaces 133, 233 and the outer surface 350 form a third seal. This provides protection against leakage to or from the outside environment.

Turning to FIGS. 5A-5D, a seal ring 400 is illustrated within a substrate block 104 and a portion of a fluid flow component 200. The substrate block 104 and the portion of the fluid flow component 200 are shown as simple blocks which are intended to highlight the shape of the seal and corresponding seal cavities. The substrate block 104 and the portion of the fluid flow component 200 may be substituted for any of the substrate blocks 104 and fluid flow components 200 shown above. The seal ring 400 is similar to the seal ring 300 with variations as discussed herein. All reference numerals are identical to those described above except as noted.

Figure 5A:
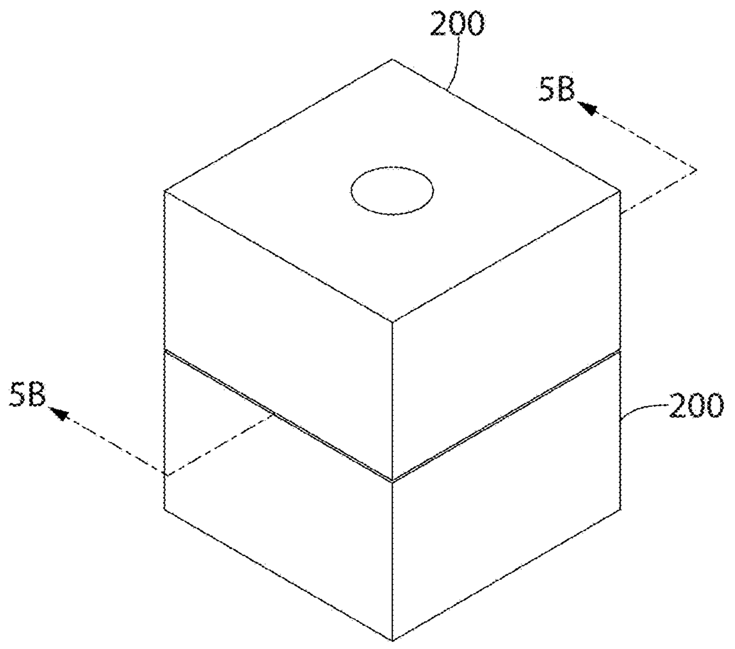
FIG. 5A is a perspective view of a second embodiment of a seal ring installed between a substrate block and a portion of an active component as may be used in the fluid delivery system of the present invention.
Figure 5B:
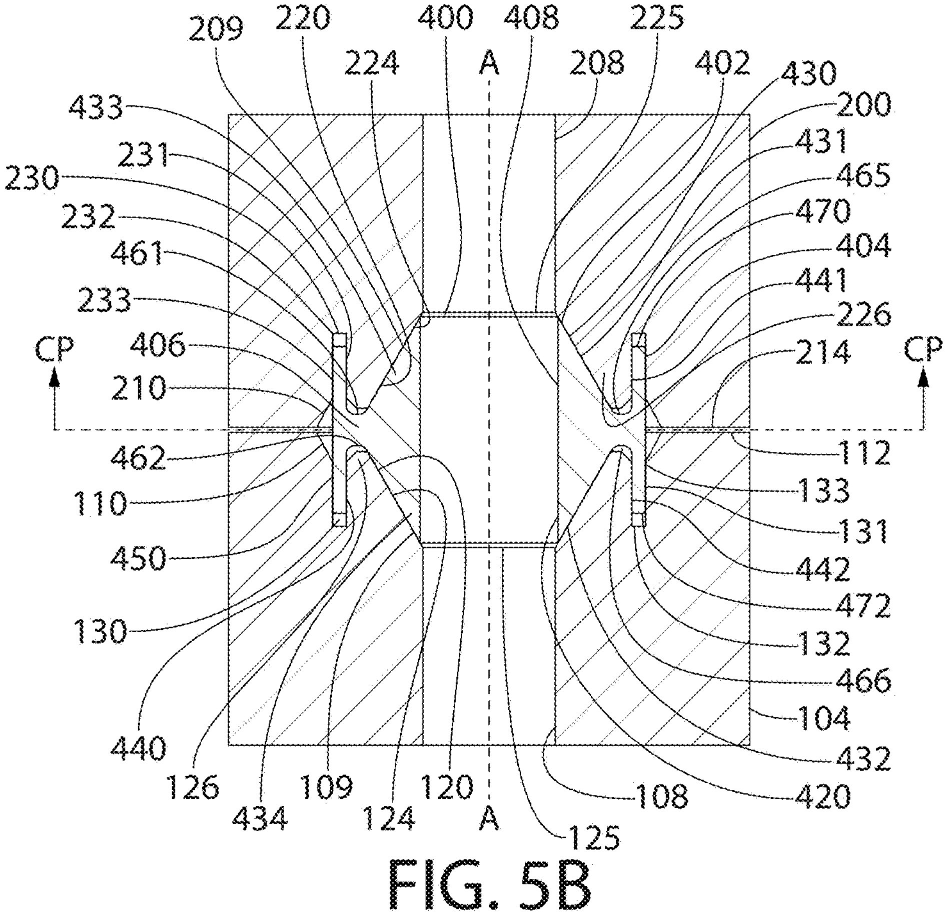
FIG. 5B is a cross-sectional view of the seal ring, the substrate block, and the portion of the active component of FIG. 5A, taken along line 5B-5B.
Figure 5C:
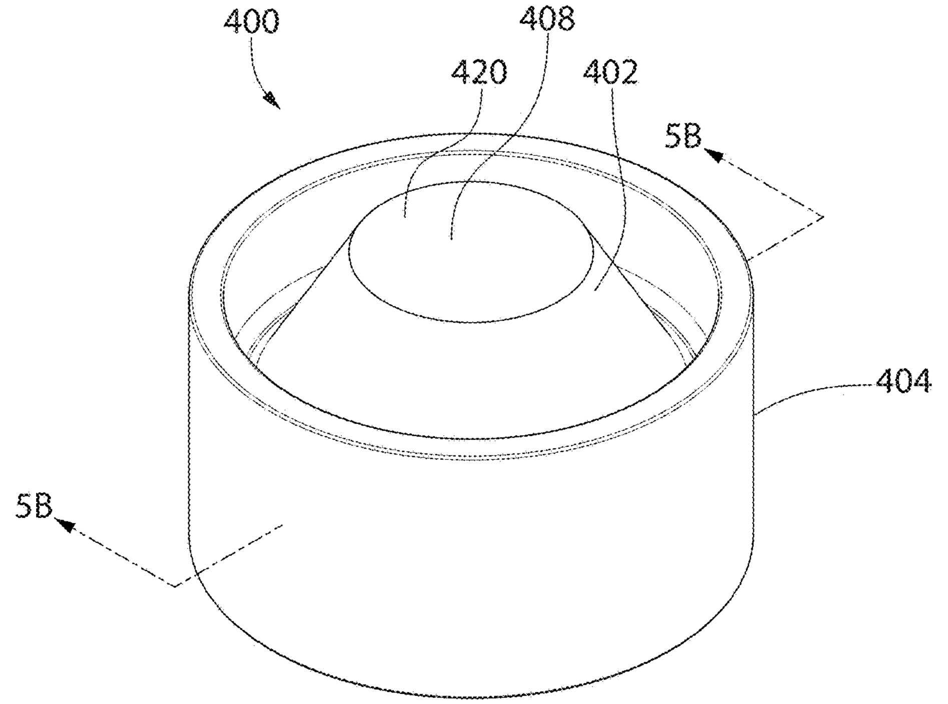
FIG. 5C is a perspective view of the seal ring of FIG. 5A.
Figure 5D:
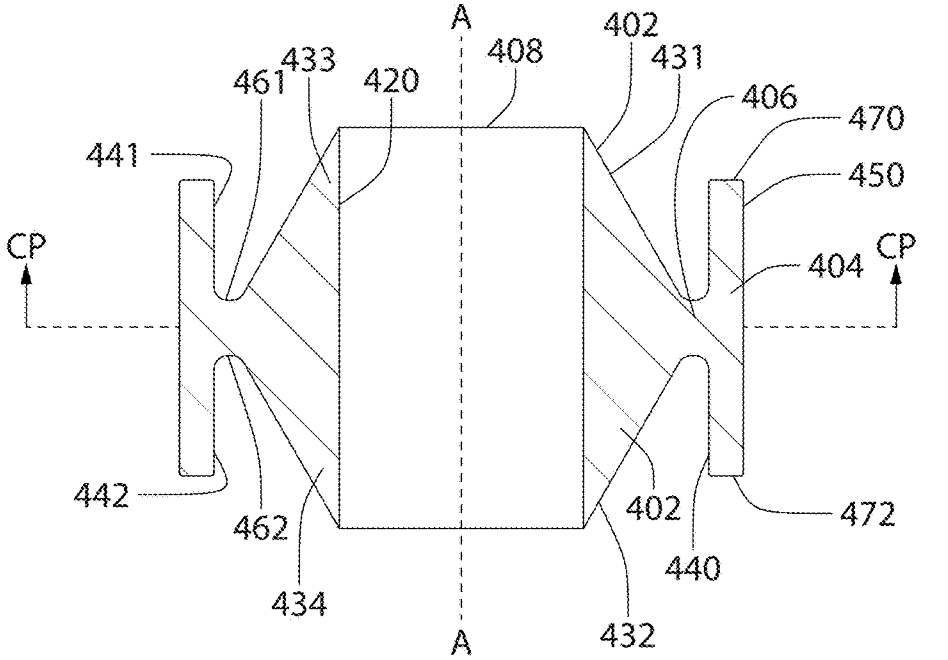
FIG. 5D is a cross-sectional view of the seal ring.

As best shown in FIG. 5B, the seal ring 400 is positioned between the fluid flow component 200 and the substrate block 104. The seal ring 400 forms a fluid-tight connection between the fluid flow component 200 and the substrate block 104. The substrate block 104 comprises a fluid passageway 108 extending from a substrate port 109. The substrate port 109 is formed in an upper surface 112 of the substrate block 104.

Similarly, the fluid flow component 200 comprises a fluid passageway 208 extending from a component port 209 formed in a lower surface 214. The substrate port 109 of the substrate block 104 is surrounded by a seal cavity 110 which receive the seal ring 400. The component port 209 of the fluid flow component 200 is surrounded by a seal cavity 210 which also receives the seal ring 400.

The seal ring 400 is formed in a generally annular configuration, with an interior sleeve 402 and an outer ring 404. The interior sleeve 402 of the seal ring 400 has a sleeve fluid passageway 408 formed through the center of the seal ring 400. The sleeve fluid passageway 408 extends along a longitudinal axis A-A. The interior sleeve 402 and the outer ring 404 are symmetrical about the longitudinal axis A-A. The sleeve fluid passageway 408 permits fluid flow through the seal ring 400 and other features of the seal ring 400 provide a hermetic seal between coupled fluid flow components 200 and substrate blocks 104. In some embodiments, the interior sleeve 402 and the outer ring 404 may not be symmetrical about the longitudinal axis A-A.

The interior sleeve 402 comprises a passageway surface 420 which forms the wall of the sleeve fluid passageway 408. The passageway surface 420 is illustrated as being of substantially constant diameter along an entirety of the passageway surface 420. Thus, the passageway surface 420 of the sleeve fluid passageway 408 joins the component port 209 to the substrate port 109. The passageway surface 420 need not be of constant diameter and may change in diameter as will be discussed below.

The interior sleeve 402 also comprises a first mating surface 430 which engages corresponding features in the seal cavities 110, 210 of the substrate block 104 and the fluid flow component 200 as will be discussed in greater detail below. The first mating surface 430 comprises an upper mating surface 431 and a lower mating surface 432. The upper mating surface 431 engages features of the seal cavity 210 of the fluid flow component 200 while the lower mating surface 432 engages features of the seal cavity 110 of the substrate block 104. The upper and lower mating surfaces 431, 432 may have a linear geometry, a convex geometry, or a concave geometry. In the present embodiment, the upper and lower mating surfaces 431, 432 have a linear geometry.

The seal ring 400 is symmetric about a central plane CP, the central plane CP perpendicular to the longitudinal axis A-A. The interior sleeve 402 of the seal ring 400 has an upper conical portion 433 and a lower conical portion 434. The upper mating surface 431 is formed on the upper conical portion 433 and the lower mating surface 432 is formed on the lower conical portion.

The outer ring 404 has an inner surface 440 and an outer surface 450. The inner surface 440 is proximate the interior sleeve 402 and faces the first mating surface 430. The outer surface 450 is opposite the inner surface 440. The inner surface 440 may be divided into an upper inner surface 441 and a lower inner surface 442.

The interior sleeve 402 is joined to the outer ring 404 by a web 406, the web 406 separating the upper and lower inner surfaces 441, 442 and the upper and lower mating surfaces 431, 432. The web 406 has an upper web surface 461 and a lower web surface 462. The upper web surface 461, along with the upper inner surface 441 of the inner surface 440 of the outer ring 404 and the upper mating surface 431 of the first mating surface 430, form an annular upper sleeve groove 465. Similarly, the lower web surface 462, along with the lower inner surface 442 of the inner surface 440 of the outer ring 404 and the lower mating surface 432 of the first mating surface 430, form an annular lower sleeve groove 466. The outer ring 404 further comprises an upper terminal surface 470 and a lower terminal surface 472.

The seal cavity 110 of the substrate block 104 surrounds the substrate port 109 as discussed above. The seal cavity 110 comprises a conical portion 124, a substrate ring 126, and a substrate seal channel 130. The conical portion 124 comprises a second mating surface 120, the conical portion 124 extending from the substrate ring 126 to the fluid passageway 108. The second mating surface 120 forms a portion of the substrate port 109 and receives the lower mating surface 432 of the first mating surface 430 of the seal ring 400. The second mating surface 120 is linear and angled with respect to the longitudinal axis A-A. However, in other embodiments the second mating surface 120 may be convex or concave or any other geometry. The second mating surface 120 may be formed as a separate surface from the substrate port 109 in alternate embodiments.

The substrate ring 126 defines the substrate port 109. The substrate port 109 terminates at the substrate ring 126 and is surrounded by the substrate ring 126. The substrate ring 126 is recessed with respect to the upper surface 112 of the substrate block 104. Surrounding the substrate ring 126 is the substrate seal channel 130. The substrate seal channel 130 is recessed with respect to the substrate ring 126 and the upper surface 112 of the substrate block 104. Thus, the substrate ring 126 protrudes above the substrate seal channel 130. The substrate ring 126 may have any desired geometry. The substrate seal channel 130 has a channel inner surface 131, a channel floor 132, and a channel outer surface 133. The channel inner surface 131 is adjacent to the substrate ring 126 and forms an outer surface of the substrate ring 126. The channel outer surface 133 is opposite the channel inner surface 133 and is radially outward from the channel inner surface 131. The channel floor 132 joins the channel inner surface 131 and the channel outer surface 133.

The seal cavities 210 of the fluid flow component 200 surround the component ports 209 as discussed above. The seal cavities 210 comprise a conical portion 224, a component ring 226, and a component seal channel 230. The conical portion 224 comprises a second mating surface 220, the conical portion 224 extending from the substrate ring 226 to the fluid passageway 208. The second mating surface 220 forms a portion of the component port 209 and receives the upper mating surface 431 of the first mating surface 430 of the seal ring 400. The second mating surface 220 is linear and angled with respect to the longitudinal axis A-A. However, in other embodiments the second mating surface 220 may be convex or concave or any other geometry. The second mating surface 220 may be formed as a separate surface from the component port 209 in alternate embodiments.

The component ring 226 defines the component port 209. The component port 209 terminates at the component ring 226 and is surrounded by the component ring 226. The component ring 226 is recessed with respect to the lower surface 214 of the fluid flow component 200. Surrounding the component ring 226 is the component seal channel 230. The component seal channel 230 is recessed with respect to the component ring 226 and the lower surface 214 of the fluid flow component 200. Thus, the component ring 226 protrudes below the component seal channel 230. The component ring 226 may have any desired geometry. The component seal channel 230 has a channel inner surface 231, a channel floor 232, and a channel outer surface 233. The channel inner surface 231 is adjacent to the component ring 226 and forms an outer surface of the component ring 226. The channel outer surface 233 is opposite the channel inner surface 231 and is radially outward from the channel inner surface 231. The channel floor 232 joins the channel inner surface 231 and the channel outer surface 233.

When in an assembled state as illustrated in FIG. 5B, the channel inner surfaces 131, 231 engage the inner surface 440 of the seal ring 400 while the channel outer surfaces 133, 233 engage the outer surface 450 of the seal ring 400. In particular, the channel inner surface 131 engages the lower inner surface 442 of the seal ring 400. The channel inner surface 231 engages the upper inner surface 441 of the seal ring 400. Thus, the outer ring 404 is radially compressed by the substrate seal channel 130 and the component seal channel 230. The upper and lower terminal surfaces 470, 472 are spaced from the channel floors 132, 232. Similarly, the upper web surface 461 is spaced from the component ring 226 and the lower web surface 462 is spaced from the substrate 126. This beneficially ensures that the first and second mating surfaces 430, 120, 220 are in contact without being over-constrained. As a result, the interface between the first and second mating surfaces 430, 120, 220 form a first seal. The interface between the channel inner surfaces 131, 231 and the inner surface 440 of the seal ring 400 form a second seal. The interface between the channel outer surfaces 133, 233 and the outer surface 450 form a third seal. This provides protection against leakage to or from the outside environment.

Preferably, the diameter of the passageway surface 420 is greater than a diameter of the fluid passageway 108 of the substrate block 104 and the fluid passageway 208 of the fluid flow component 200. However, in other implementations, the diameter of the passageway surface 420 may be equal to the diameter of the fluid passageways 108, 208. The conical portions 124, 224 of the substrate block and the fluid flow component 200 join the respective fluid passageways 108, 208 at an oblique angle. The conical portions 124, 224 also extend beyond the interior sleeve 402. Otherwise stated, the upper and lower conical portions 433, 434 extend a first distance from the central plane CP while the conical portions 124, 224 of the substrate block 104 and the fluid flow component 200 extend a second distance from the central plane CP. The second distance is greater than the first distance. As a result, a transition portion 125, 225 of the conical portions 124, 224 remain exposed to fluid flowing within the fluid passageways 108, 208, 408.

Preferably, the interior sleeve 402 has a first height which is greater than a second height of the outer ring 404. However, in other implementations, the first and second heights are equal, or the second height may be greater than the first height as shown in the seal ring 300.

Figure 5E:
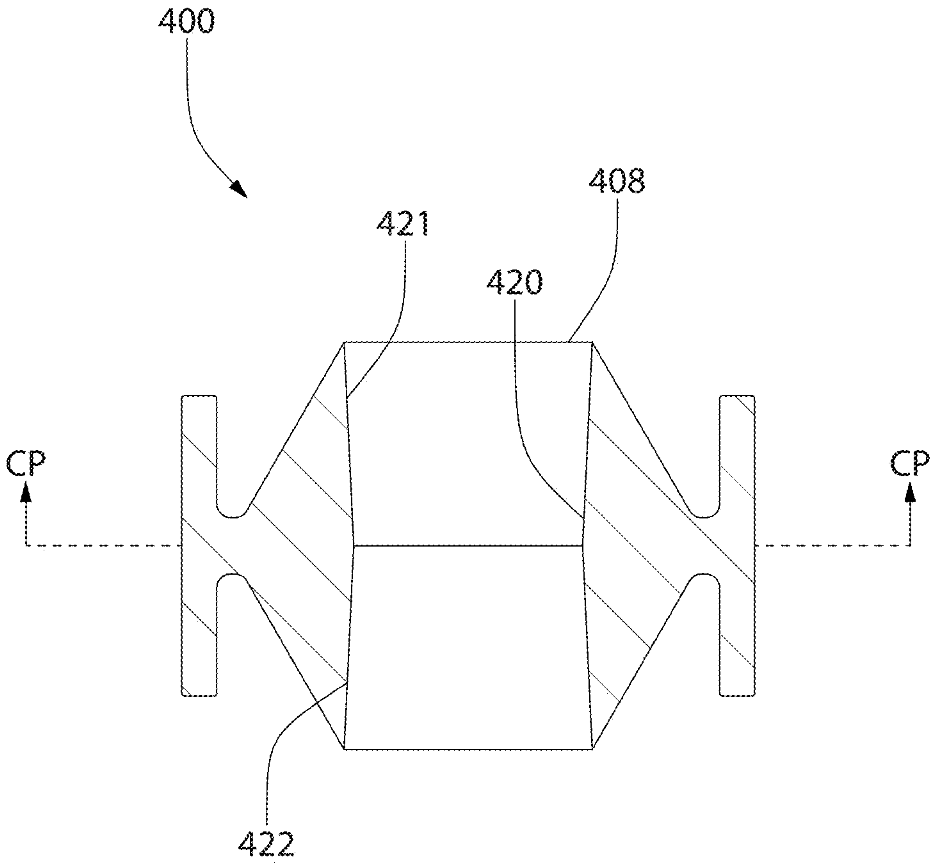
FIG. 5E is a cross-sectional view of another embodiment of the seal ring.

Turning to FIG. 5E, another version of the seal ring 400 is illustrated in cross-section. The seal ring 400 shown in FIG. 5E is identical to the seal ring shown in FIGS. 5A-5D with the exception that the passageway surface 420 tapers from the central plane CP. The taper angle may be within the range of 0.1 to 10 degrees, and preferably between 1 and 2 degrees. This is intended to compensate for deflection of the interior sleeve 402 during assembly. The passageway surface 420 has an upper portion 421 and a lower portion 422, with the upper and lower portions 421, 422 having an increasing diameter with increasing distance from the central plane CP.

Turning to FIGS. 6A-D, a seal ring 500 is illustrated within a substrate block 104 and a portion of a fluid flow component 200. The substrate block 104 and the portion of the fluid flow component 200 are shown as simple blocks which are intended to highlight the shape of the seal and corresponding seal cavities. The substrate block 104 and the portion of the fluid flow component 200 may be substituted for any of the substrate blocks 104 and fluid flow components 200 shown above. The seal ring 500 is similar to the seal ring 400 with variations as discussed herein. All reference numerals are identical to those described above except as noted.

Figure 6A:
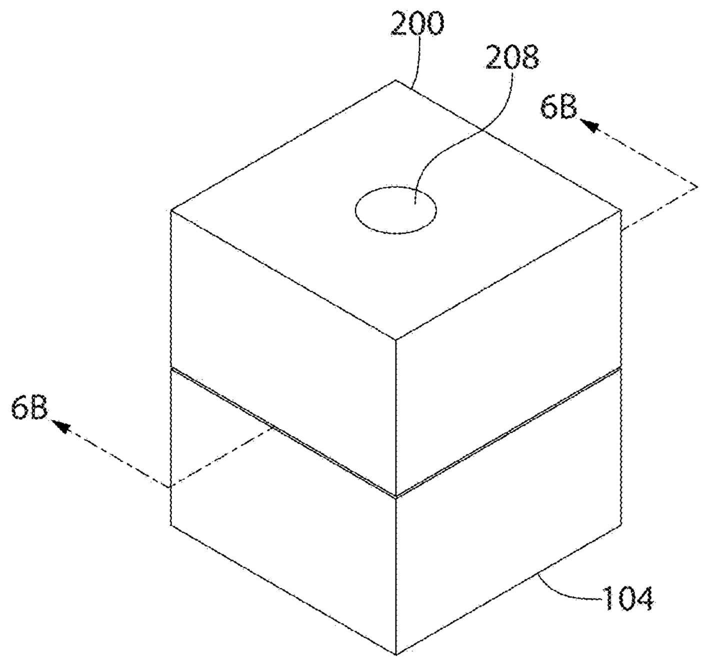
FIG. 6A is a perspective view of a third embodiment of a seal ring installed between a substrate block and a portion of an active component as may be used in the fluid delivery system of the present invention.
Figure 6B:
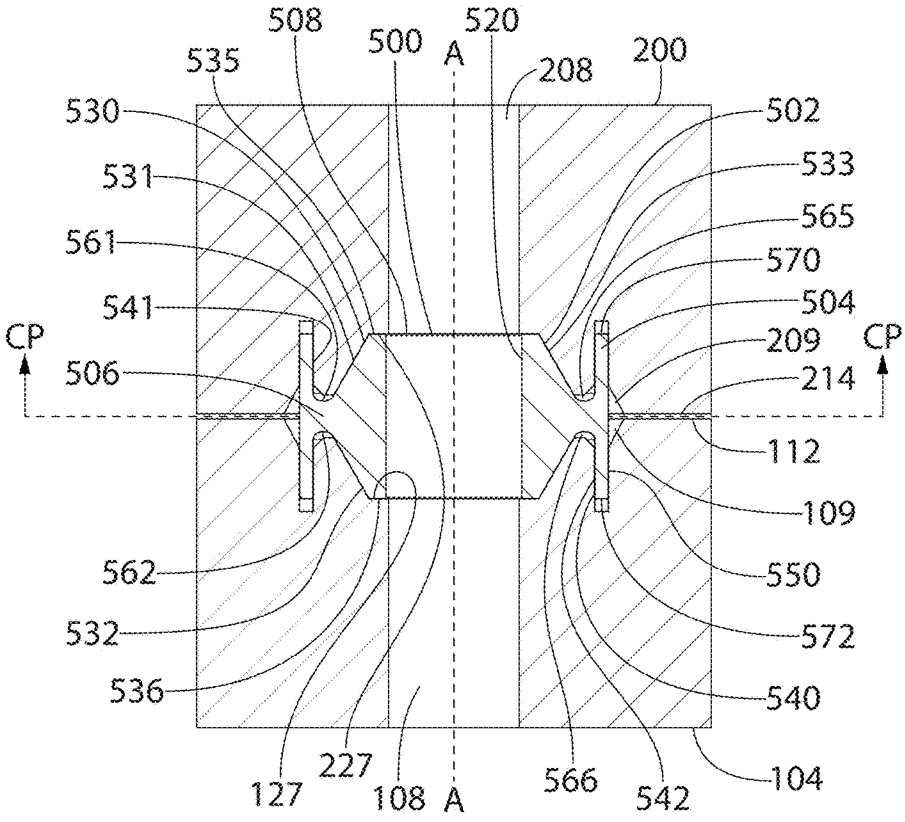
FIG. 6B is a cross-sectional view of the seal ring of FIG. 6A, taken along line 6B-6B.
Figure 6C:
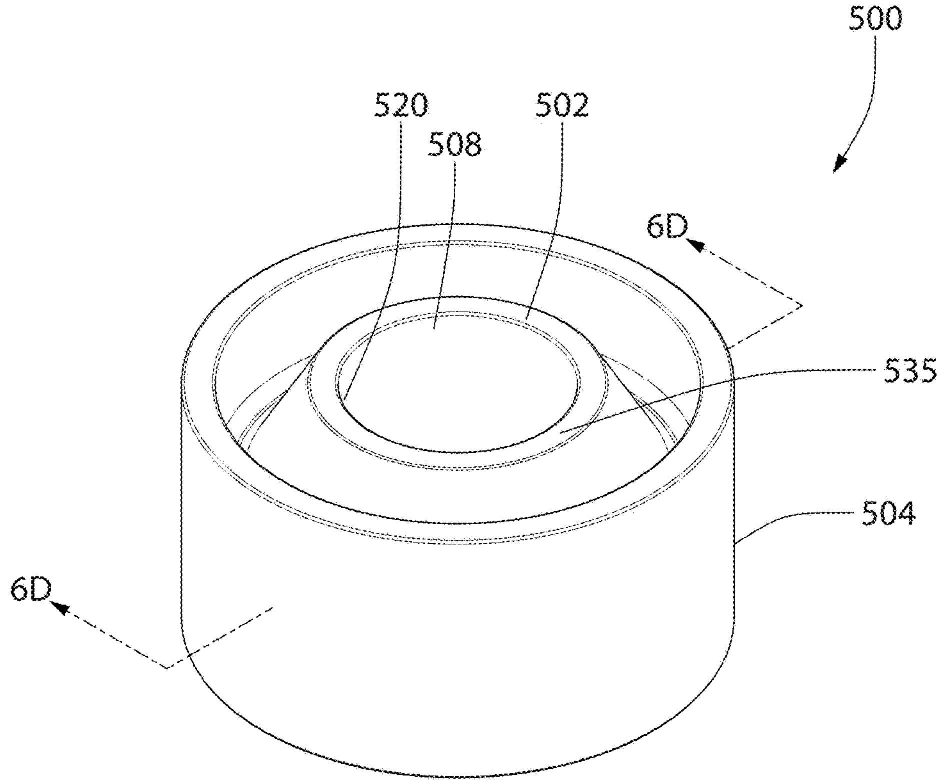
FIG. 6C is a perspective view of the seal ring of FIG. 6A.
Figure 6D:
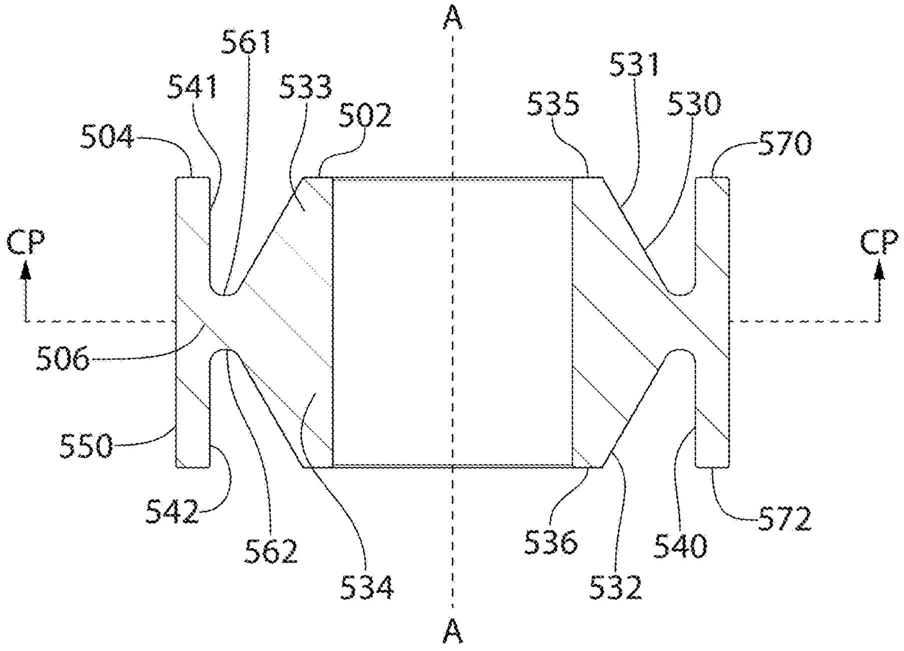
FIG. 6D is a cross-sectional view of the seal ring.

As best shown in FIG. 6B, the seal ring 500 is positioned between the fluid flow component 200 and the substrate block 104. The seal ring 500 forms a fluid-tight connection between the fluid flow component 200 and the substrate block 104. The substrate block 104 comprises a fluid passageway 108 extending from a substrate port 109. The substrate port 109 is formed in an upper surface 112 of the substrate block 104.

Similarly, the fluid flow component 200 comprises a fluid passageway 208 extending from a component port 209 formed in a lower surface 214. The substrate port 109 of the substrate block 104 is surrounded by a seal cavity 110 which receive the seal ring 500. The component port 209 of the fluid flow component 200 is surrounded by a seal cavity 210 which also receives the seal ring 500.

The seal ring 500 is formed in a generally annular configuration, with an interior sleeve 502 and an outer ring

504. The interior sleeve 502 of the seal ring 500 has a sleeve fluid passageway 508 formed through the center of the seal ring 500. The sleeve fluid passageway 508 extends along a longitudinal axis A-A. The interior sleeve 502 and the outer ring 504 are symmetrical about the longitudinal axis A-A. The sleeve fluid passageway 508 permits fluid flow through the seal ring 500 and other features of the seal ring 500 provide a hermetic seal between coupled fluid flow components 200 and substrate blocks 104. In some embodiments, the interior sleeve 502 and the outer ring 504 may not be symmetrical about the longitudinal axis A-A.

The interior sleeve 502 comprises a passageway surface 520 which forms the wall of the sleeve fluid passageway 508. The passageway surface 520 is illustrated as being of substantially constant diameter along an entirety of the passageway surface 520. Thus, the passageway surface 520 of the sleeve fluid passageway 508 joins the component port 209 to the substrate port 109. The passageway surface 520 need not be of constant diameter and may change in diameter as will be discussed below.

The interior sleeve 502 also comprises a first mating surface 530 which engages corresponding features in the seal cavities 110, 210 of the substrate block 104 and the fluid flow component 200 as will be discussed in greater detail below. The first mating surface 530 comprises an upper mating surface 531 and a lower mating surface 532. The upper mating surface 531 engages features of the seal cavity 210 of the fluid flow component 200 while the lower mating surface 532 engages features of the seal cavity 110 of the substrate block 104. The upper and lower mating surfaces 531, 532 may have a linear geometry, a convex geometry, or a concave geometry. In the present embodiment, the upper and lower mating surfaces 531, 532 have a linear geometry.

The upper and lower mating surfaces 531, 532 further comprise end surfaces 535, 536 which engage corresponding floor surfaces 127, 227 of the conical portions 124, 224 of the substrate block 104 and the fluid flow component 200. The upper and lower mating surfaces 531, 532 and the floor surfaces 127, 227 are substantially perpendicular to the longitudinal axis A-A. Thus, the conical portions 124, 224 of the substrate block and the fluid flow component 200 join the respective fluid passageways 108, 208 at a perpendicular angle. The conical portions 124, 224 do not extend beyond the interior sleeve 502. Otherwise stated, the upper and lower conical portions 533, 534 extend a first distance from the central plane CP while the conical portions 124, 224 of the substrate block 104 and the fluid flow component 200 extend a second distance from the central plane CP. The second distance is equal to the first distance.

The seal ring 500 is symmetric about a central plane CP, the central plane CP perpendicular to the longitudinal axis A-A. The interior sleeve 502 of the seal ring 500 has an upper conical portion 533 and a lower conical portion 534. The upper mating surface 531 is formed on the upper conical portion 533 and the lower mating surface 532 is formed on the lower conical portion.

The outer ring 504 has an inner surface 540 and an outer surface 550. The inner surface 540 is proximate the interior sleeve 502 and faces the first mating surface 530. The outer surface 550 is opposite the inner surface 540. The inner surface 540 may be divided into an upper inner surface 541 and a lower inner surface 542.

The interior sleeve 502 is joined to the outer ring 504 by a web 506, the web 506 separating the upper and lower inner surfaces 541, 542 and the upper and lower mating surfaces 531, 532. The web 506 has an upper web surface 561 and a lower web surface 562. The upper web surface 561, along with the upper inner surface 541 of the inner surface 540 of the outer ring 504 and the upper mating surface 531 of the first mating surface 530, form an annular upper sleeve groove 565. Similarly, the lower web surface 562, along with the lower inner surface 542 of the inner surface 540 of the outer ring 504 and the lower mating surface 532 of the first mating surface 530, form an annular lower sleeve groove 566. The outer ring 504 further comprises an upper terminal surface 570 and a lower terminal surface 572.

Preferably, the interior sleeve 502 has a first height which is equal to a second height of the outer ring 504. However, in other implementations, the first and second heights may be different as shown in the seal rings 300, 400 described above.

Figure 6E:
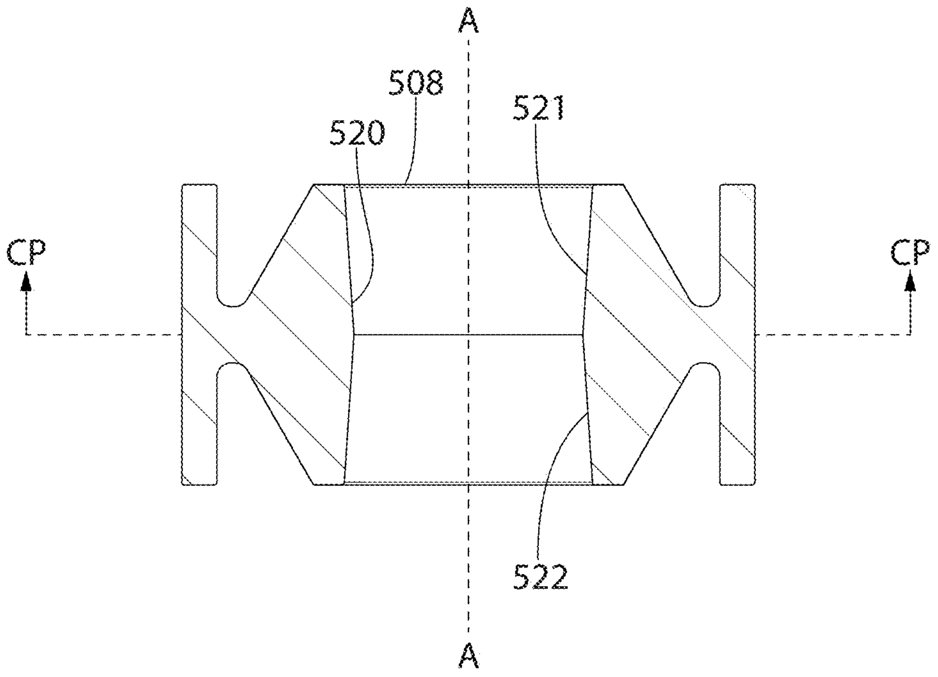
FIG. 6E is a cross-sectional view of another embodiment of the seal ring.

Turning to FIG. 6E, another version of the seal ring 500 is illustrated in cross-section. The seal ring 500 shown in FIG. 6E is identical to the seal ring shown in FIGS. 6A-6D with the exception that the passageway surface 520 tapers from the central plane CP. The taper angle may be within the range of 0.1 to 10 degrees, and preferably between 1 and 2 degrees. This is intended to compensate for deflection of the interior sleeve 502 during assembly. The passageway surface 520 has an upper portion 521 and a lower portion 522, with the upper and lower portions 521, 522 having an increasing diameter with increasing distance from the central plane CP.

Figure 7A:
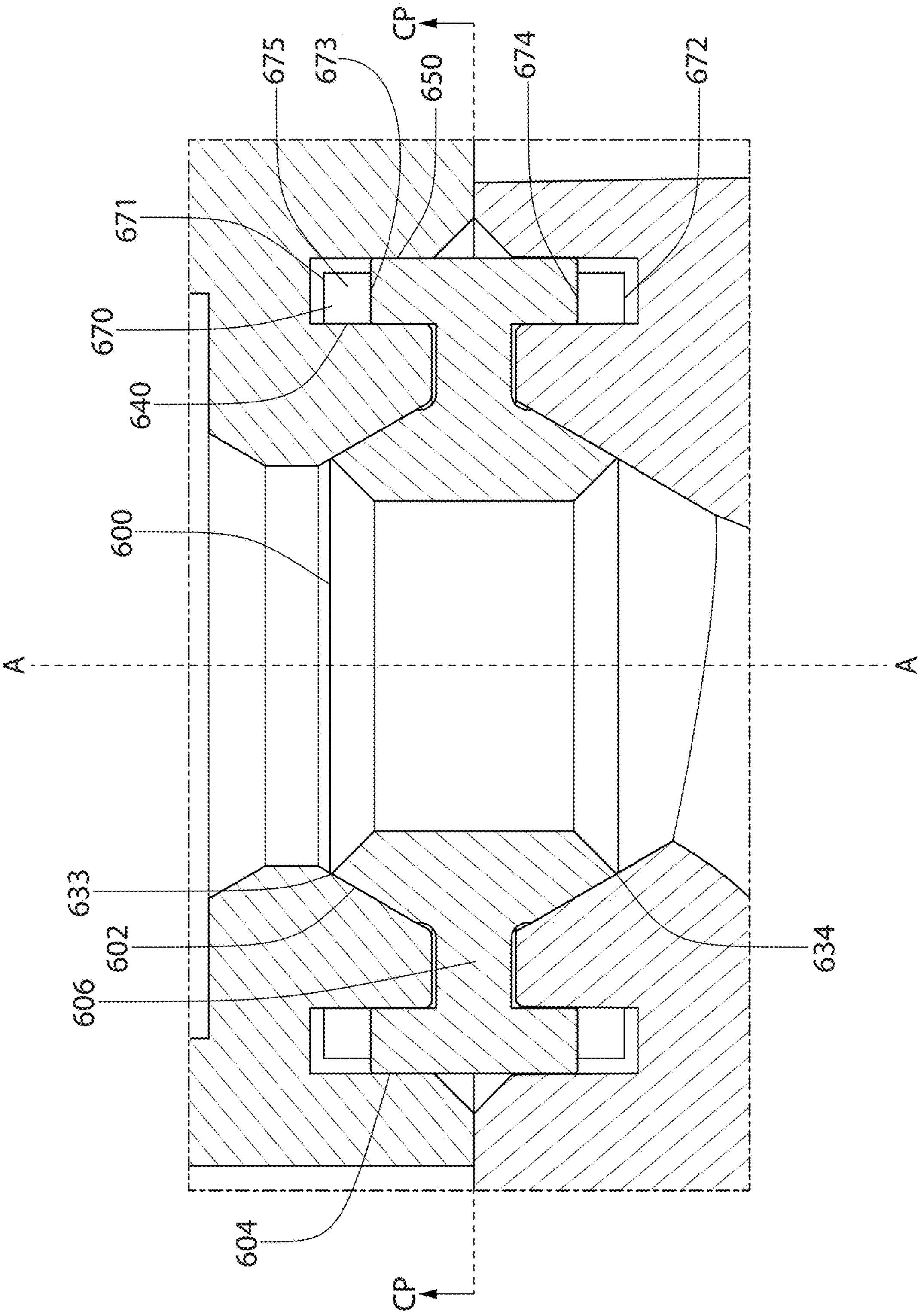
FIG. 7A is a detail view of a fourth embodiment of a seal ring installed between a component and a substrate block as may be used in the fluid delivery system of the present invention, taken along line 4B-4B.
Figure 7B:
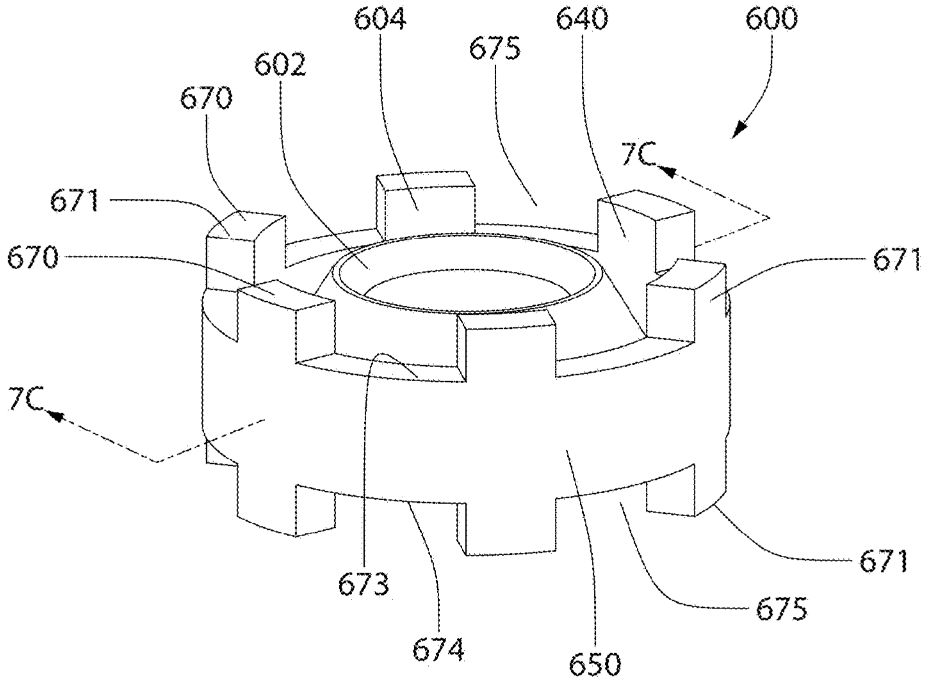
FIG. 7B is a perspective view of the seal ring of FIG. 7A.
Figure 7C:
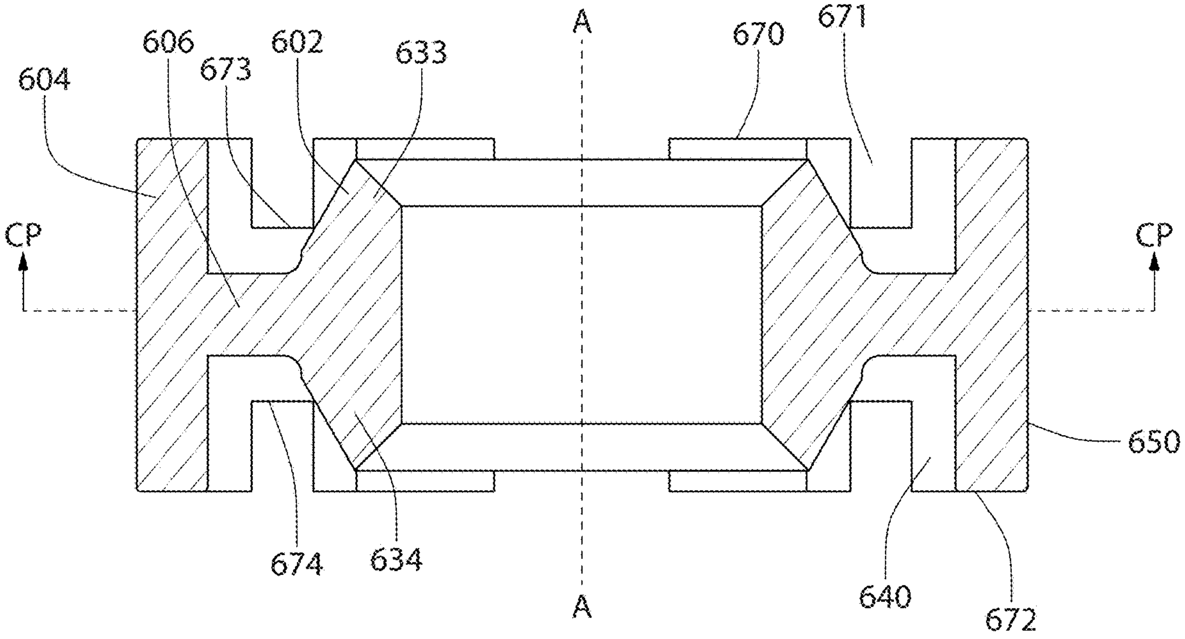
FIG. 7C is a cross-sectional view of the seal ring of FIG. 7B, taken along line 7C-7C.

FIGS. 7A-C illustrate another embodiment of a seal ring 600, the seal ring 600 being substantially identical to the seal ring 300 except as discussed. The seal ring 600 has an interior sleeve 602 and the outer ring 604. A plurality of castellations 671 are formed into an outer ring 604. The castellations 671 extend from the upper and lower terminal surfaces 670, 672 to floor surfaces 673, 674. The castellations 671 are separated by grooves 675 that extend from the inner surface 640 to the outer surface 650 of the outer ring 604. Thus, the castellations 671 alternate with the grooves 675 around the outer ring 604.

The floor surfaces 673, 674 have a height from a central plane CP which is less than a height of upper and lower conical portions 633, 634 of the interior sleeve 602 from the central plane CP. The outer ring 604 has a height which is greater than a height of the interior sleeve 602. The floor surfaces 673, 674 may also have a height which is greater than a height of a web 606 as measured from the central plane CP. However, in other implementations, the floor surfaces 673, 674 may have a height equal to the height of the web 606.

In some implementations, there may be six castellations 671 formed into the upper terminal surface 670 and six castellations 671 formed into the lower terminal surface 672. In other implementations, there may be greater or fewer than six castellations 671 in each of the upper and lower terminal surfaces 670, 672. The castellations 671 of the upper and lower terminal surfaces 670, 672 may be aligned or may be offset with respect to one another. The castellations 671 may have a circumferential width that is greater than, equal to, or less than a circumferential width of the grooves 675. The seal ring 600 may be directly substituted for the seal ring 300, as it is geometrically compatible, but the castellations 671 assist in retaining the seal ring 600 within a seal cavity without requiring excessive insertion force. This beneficially facilitates seal ring installation during assembly and maintenance tasks.

While the invention has been described with respect to specific examples including presently preferred modes of carrying out the invention, those skilled in the art will appreciate that there are numerous variations and permutations of the above-described systems and techniques. It is to be understood that other embodiments may be utilized, and structural and functional modifications may be made without departing from the scope of the present invention. Thus, the spirit and scope of the invention should be construed broadly as set forth in the appended claims.

The invention may be more fully described via the exemplary claims below.

Exemplary Claim 1: A fluid delivery system comprising: a substrate block comprising: an upper surface; a substrate port in the upper surface; a substrate fluid passageway extending from the substrate port; a substrate ring defining the substrate port; a substrate seal channel formed in the upper surface and surrounding the substrate ring, an outer surface of the substrate ring forming an inner surface of the substrate seal channel; and a conical portion extending from the substrate ring to the substrate fluid passageway; an active component comprising: a lower surface; a component port in the lower surface; a component fluid passageway extending from the component port; a component ring defining the component port; a component seal channel formed in the lower surface and surrounding the component ring, an outer surface of the component ring forming an inner surface of the component seal channel; and a conical portion extending from the component ring to the component fluid passageway; a seal ring comprising: an interior sleeve comprising an upper conical portion, a lower conical portion, and a central portion, the interior sleeve defining a sleeve fluid passageway, the sleeve fluid passageway having a diameter that is substantially constant along a longitudinal axis; and an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve; the active component mounted to the substrate block so that: (1) the substrate port and the component port are aligned; and (2) the seal ring nests in each of the substrate seal channel and the component seal channel and the seal ring fluidly seals the substrate fluid passageway and the component fluid passageway.

Exemplary Claim 2: The fluid delivery system of exemplary claim 1 wherein the seal ring is symmetrical about the longitudinal axis.

Exemplary Claim 3: The fluid delivery system of exemplary claim 1 or exemplary claim 2 wherein the substrate fluid passageway has a diameter, the diameter of the substrate fluid passageway being less than the diameter of the sleeve fluid passageway.

Exemplary Claim 4: The fluid delivery system of any one of exemplary claims 1 to 3 wherein the interior sleeve of the seal ring has a first height and the outer ring of the seal ring has a second height, the first height being greater than the second height.

Exemplary Claim 5: The fluid delivery system of any one of exemplary claims 1 to 4 wherein the conical portion of the substrate port joins the substrate fluid passageway at an oblique angle.

Exemplary Claim 6: The fluid delivery system of exemplary claim 5 wherein the lower conical portion of the seal ring extends a first distance from a central plane and the conical portion of the substrate port extends a second distance from the central plane, the second distance being greater than the first distance.

Exemplary Claim 7: The fluid delivery system of any one of exemplary claims 1 to 6 wherein a transition portion of the conical portion of the substrate port remains exposed.

Exemplary Claim 8: The fluid delivery system of exemplary claim 1 or exemplary claim 2 wherein the interior sleeve of the seal ring has a first height and the outer ring of the seal ring has a second height, the first and second heights being equal.

Exemplary Claim 9: The fluid delivery system of any one of exemplary claims 1, 2, or 8 wherein the conical portion of the substrate port joins the substrate fluid passageway at a perpendicular angle.

Exemplary Claim 10: The fluid delivery system of any one of exemplary claims 1, 2, 8, or 9 wherein the conical portion of the substrate port terminates in an end surface that is perpendicular to the longitudinal axis.

Exemplary Claim 11: The fluid delivery system of exemplary claim 9 or exemplary claim 10 wherein the lower conical portion of the seal ring extends a first distance from a central plane and the conical portion of the substrate port extends a second distance from the central plane, the second distance being equal to the first distance.

Exemplary Claim 12: The fluid delivery system of any one of exemplary claims 1 to 11 wherein the outer ring comprises castellations.

Exemplary Claim 13: The fluid delivery system of exemplary claim 12 wherein the castellations are formed into upper and lower terminal surfaces of the outer ring.

Exemplary Claim 14: A seal ring, the seal ring comprising: an interior sleeve comprising an upper conical portion, a lower conical portion, and a central portion, the interior sleeve defining a sleeve fluid passageway, the sleeve fluid passageway having a diameter that is substantially constant along a longitudinal axis; and an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve.

Exemplary Claim 15: The seal ring of exemplary claim 14 wherein the seal ring is symmetrical about the longitudinal axis.

Exemplary Claim 16: The seal ring of exemplary claim 14 or exemplary claim 15 wherein the interior sleeve of the seal ring has a first height and the outer ring of the seal ring has a second height, the first height being greater than the second height.

Exemplary Claim 17: The seal ring of any one of exemplary claims 14 to 16 wherein the upper conical portion joins the sleeve fluid passageway at an acute angle.

Exemplary Claim 18: The seal ring of exemplary claim 17 wherein the interior sleeve terminates in an edge, the edge defining an end of the sleeve fluid passageway.

Exemplary Claim 19: The seal ring of any one of exemplary claims 14 to 18 wherein outer surfaces of the upper conical portion and the lower conical portion have a constant slope.

Exemplary Claim 20: The seal ring of exemplary claim 14 or exemplary claim 15 wherein the interior sleeve of the seal ring has a first height and the outer ring of the seal ring has a second height, the first and second heights being equal.

Exemplary Claim 21: The seal ring of exemplary claims 14, 15, or 20 wherein the upper and lower conical portions terminate in an end surface that is perpendicular to the longitudinal axis.

Exemplary Claim 22: The seal ring of any one of exemplary claims 14 to 21 wherein the outer ring comprises castellations.

Exemplary Claim 23: The seal ring of exemplary claim 22 wherein the castellations are formed into upper and lower terminal surfaces of the outer ring.

Exemplary Claim 24: A fluid delivery system comprising: a substrate block comprising: an upper surface; a substrate port in the upper surface; a substrate fluid passageway extending from the substrate port; a substrate ring defining the substrate port; a substrate seal channel formed in the upper surface and surrounding the substrate ring, an outer surface of the substrate ring forming an inner surface of the substrate seal channel; and a conical portion extending from the substrate ring to the substrate fluid passageway; an active component comprising: a lower surface; a component port in the lower surface; a component fluid passageway extending from the component port; a component ring defining the component port; a component seal channel formed in the lower surface and surrounding the component ring, an outer surface of the component ring forming an inner surface of the component seal channel; and a conical portion extending from the component ring to the component fluid passageway; a seal ring comprising: an interior sleeve comprising an upper conical portion, a lower conical portion, and a central portion, the interior sleeve defining a sleeve fluid passageway; and an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve; the active component mounted to the substrate block so that: (1) the substrate port and the component port are aligned; and (2) the seal ring nests in each of the substrate seal channel and the component seal channel and the seal ring fluidly seals the substrate fluid passageway and the component fluid passageway; and wherein the outer ring comprises castellations.

Exemplary Claim 25: The fluid delivery system of exemplary claim 24 wherein the castellations comprise a plurality of grooves extending from an outer surface of the outer ring to the inner surface of the outer ring.

Exemplary Claim 26: The fluid delivery system of exemplary claim 24 or exemplary claim 25 wherein the castellations comprise a plurality of floor surfaces, the floor surfaces having a height from a central plane which is less than a height of the upper and lower conical portions as measured from the central plane.

Exemplary Claim 27: The fluid delivery system of any one of exemplary claims 24 to 26 wherein the outer ring has a height which is greater than a height of the interior sleeve.

Exemplary Claim 28: The fluid delivery system of any one of exemplary claims 24 to 27 wherein the castellations are formed into upper and lower terminal surfaces of the outer ring.

Exemplary Claim 29: The fluid delivery system of exemplary claim 28 wherein the castellations formed into the upper edge of the outer ring are aligned with the castellations formed into the lower edge of the outer ring.

What is claimed is:

1. A fluid delivery system comprising:

a substrate block comprising:

an upper surface;

a substrate port in the upper surface;

a substrate fluid passageway extending from the substrate port;

a substrate ring defining the substrate port;

a substrate seal channel formed in the upper surface and surrounding the substrate ring, an outer surface of the substrate ring forming an inner surface of the substrate seal channel; and a conical portion extending from the substrate ring to the substrate fluid passageway, the conical portion terminating in an end surface, the end surface extending to the substrate fluid passageway;

an active component comprising:

a lower surface;

a component port in the lower surface;

a component fluid passageway extending from the component port;

a component ring defining the component port;

a component seal channel formed in the lower surface and surrounding the component ring, an outer surface of the component ring forming an inner surface of the component seal channel; and a conical portion extending from the component ring to the component fluid passageway;

a seal ring comprising:

an interior sleeve comprising an upper conical portion, a lower conical portion, and a central portion, the interior sleeve defining a sleeve fluid passageway, the sleeve fluid passageway having a diameter that is substantially constant along a longitudinal axis; and an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve;

the active component mounted to the substrate block so that: (1) the substrate port and the component port are aligned; and (2) the seal ring nests in each of the substrate seal channel and the component seal channel and the seal ring fluidly seals the substrate fluid passageway and the component fluid passageway;

wherein the end surface of the conical portion of the substrate port is perpendicular to the longitudinal axis; and wherein the seal ring is symmetric about a central plane, the sleeve fluid passageway having a diameter that constantly increases with increasing distance from the central plane along a longitudinal axis, the diameter having a minimum at the central plane.

2. The fluid delivery system of claim 1 wherein the seal ring is symmetrical about the longitudinal axis.

3. The fluid delivery system of claim 1 wherein the substrate fluid passageway has a diameter, the diameter of the substrate fluid passageway being less than the diameter of the sleeve fluid passageway.

4. The fluid delivery system of claim 1 wherein the interior sleeve of the seal ring has a first height and the outer ring of the seal ring has a second height, the first and second heights being equal.

5. The fluid delivery system of claim 1 wherein the upper and lower conical portions of the seal ring terminate in end surfaces that are perpendicular to the longitudinal axis.

6. The fluid delivery system of claim 1 wherein the lower conical portion of the seal ring extends a first distance from a central plane and the conical portion of the substrate block extends a second distance from the central plane, the second distance being equal to the first distance.

7. The fluid delivery system of claim 1 wherein the outer ring comprises castellations formed into upper and lower terminal surfaces of the outer ring.

8. A seal ring, the seal ring comprising:

an interior sleeve comprising an upper conical portion, a lower conical portion, and a central portion, the interior sleeve defining a sleeve fluid passageway, the sleeve fluid passageway having a diameter that is substantially constant along a longitudinal axis; and an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve;

wherein the upper and lower conical portions terminate in end surfaces that are perpendicular to the longitudinal axis, the end surfaces extending from the sleeve fluid passageway; and wherein the seal ring is symmetric about a central plane, the sleeve fluid passageway having a diameter that constantly increases with increasing distance from the central plane along a longitudinal axis, the diameter having a minimum at the central plane.

9. The seal ring of claim 8 wherein outer surfaces of the upper conical portion and the lower conical portion have a constant slope.

10. A fluid delivery system comprising:

a substrate block comprising:

an upper surface;

a substrate port in the upper surface;

a substrate fluid passageway extending from the substrate port;

a substrate ring defining the substrate port;

a substrate seal channel formed in the upper surface and surrounding the substrate ring, an outer surface of the substrate ring forming an inner surface of the substrate seal channel; and a conical portion extending from the substrate ring to the substrate fluid passageway;

an active component comprising:

a lower surface;

a component port in the lower surface;

a component fluid passageway extending from the component port;

a component ring defining the component port;

a component seal channel formed in the lower surface and surrounding the component ring, an outer surface of the component ring forming an inner surface of the component seal channel; and a conical portion extending from the component ring to the component fluid passageway;

a seal ring comprising:

an interior sleeve comprising an upper conical portion, a lower conical portion, and a central portion, the interior sleeve defining a sleeve fluid passageway; and an outer ring connected to the central portion of the interior sleeve and surrounding the interior sleeve so that: (1) an annular upper sleeve groove is formed between an upper portion of the outer ring and an upper portion of the interior sleeve; and (2) an annular lower sleeve groove is formed between a lower portion of the outer ring and a lower portion of the interior sleeve;

the active component mounted to the substrate block so that: (1) the substrate port and the component port are aligned; and (2) the seal ring nests in each of the substrate seal channel and the component seal channel and the seal ring fluidly seals the substrate fluid passageway and the component fluid passageway; and wherein the seal ring is symmetric about a central plane, the sleeve fluid passageway having a diameter that constantly increases with increasing distance from the central plane along a longitudinal axis, the diameter having a minimum at the central plane.

11. The fluid delivery system of claim 10 wherein the conical portion of the substrate block terminates in an end surface, the end surface extending to the substrate fluid passageway and perpendicular to the longitudinal axis.

12. The fluid delivery system of claim 10 wherein the interior sleeve of the seal ring has a first height and the outer ring of the seal ring has a second height, the first and second heights being equal.

13. The fluid delivery system of claim 10 wherein the upper and lower conical portions of the seal ring terminate in end surfaces that are perpendicular to the longitudinal axis.

14. The fluid delivery system of claim 10 wherein the lower conical portion of the seal ring extends a first distance from the central plane and the conical portion of the substrate block extends a second distance from the central plane, the second distance being equal to the first distance.

* * * * *